US012677300B2

(12) United States Patent
Dutta et al.

(10) Patent No.: US 12,677,300 B2
(45) Date of Patent: Jul. 7, 2026

(54) SIGNALING RESOURCE INFORMATION FOR SIDELINK RELIABILITY

(71) Applicant: QUALCOMM INCORPORATED, San Diego, CA (US)

(72) Inventors: Sourjya Dutta, San Diego, CA (US); Tien Viet Nguyen, Bridgewater, NJ (US); Kapil Gulati, Belle Mead, NJ (US); Gabi Sarkis, San Diego, CA (US); Shuanshuan Wu, San Diego, CA (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/570,266

(22) PCT Filed: Aug. 5, 2021

(86) PCT No.: PCT/CN2021/110747
§ 371 (c)(1),
(2) Date: Dec. 14, 2023

(87) PCT Pub. No.: WO2023/010386
PCT Pub. Date: Feb. 9, 2023

(65) Prior Publication Data
US 2024/0284481 A1 Aug. 22, 2024

(51) Int. Cl.
*H04W 72/25* (2023.01)
*H04W 72/40* (2023.01)

(52) U.S. Cl.
CPC ........... *H04W 72/25* (2023.01); *H04W 72/40* (2023.01)

(58) Field of Classification Search
CPC .............................. H04W 72/25; H04W 72/40
(Continued)

(56) References Cited

U.S. PATENT DOCUMENTS

2020/0229171 A1   7/2020   Khoryaev et al.
2021/0127364 A1   4/2021   Panteleev et al.
(Continued)

FOREIGN PATENT DOCUMENTS

CN       109565791 A      4/2019
CN       110447294 A      11/2019

OTHER PUBLICATIONS

Intel Corporation: "Summary#3 for AI 7.2.4.2.2 Mode-2 Resource Allocation", 3GPP Draft, 3GPP TSG RAN WG1 Meeting #99, R1-1913525, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 18, 2019-Nov. 22, 2019, Nov. 25, 2019 (Nov. 25, 2019), XP051830806, 46 Pages, Sections 1-10.
(Continued)

*Primary Examiner* — Hermon Asres
(74) *Attorney, Agent, or Firm* — Holland & Hart LLP

(57) ABSTRACT

Methods, systems, and devices for wireless communications are described. A first UE may receive signaling indicating one or more resource reservation rules associated with transmitting a sidelink message that includes reservation information associated with one or more sidelink resources. The first UE may determine, based on the one or more resource reservation rules, to include the sidelink message in a physical layer control signal, or a medium access control layer control signal, or both. The first UE may then transmit, to a second UE, the sidelink message in the physical layer control signal, or the medium access control layer control signal, or both based on the determining.

28 Claims, 14 Drawing Sheets

(58) Field of Classification Search
USPC ........................................................ 370/329
See application file for complete search history.

(56) References Cited

U.S. PATENT DOCUMENTS

| 2022/0167365 A1* | 5/2022 | Hu | .......................... H04W 4/40 |
| 2023/0096178 A1* | 3/2023 | Wu | ....................... H04W 72/51 |
| | | | 370/329 |
| 2024/0284481 A1* | 8/2024 | Dutta | .................... H04L 5/0094 |

OTHER PUBLICATIONS

Interdigital Inc: "Mode 2a and Mode 2d for Nr V2X Resource Allocation", 3GPP RAN WG1 Meeting AH 1901, R1-1900769, (R16 V2X WI AI72414 Resource Allocation), 3GPP, Mobile Competence Centre, France, vol. RAN WG1, No. Taipei, Taiwan, Jan. 21, 2019-Jan. 25, 2019, Jan. 20, 2019, XP051593615, 16 Pgs, pp. 1-8, pp. 11-13, 6.2 Detailed Procedure for Mode 2a using LBT Scheme, section "3 Resource allocation Mode 2d", pp. 13-15, 6.3 Detailed procedure for Mode 2a using Announcement Message scheme, paragraph 12.2.21, paragraph [06.21 [06.3].
International Search Report and Written Opinion—PCT/CN2021/110747—ISA/EPO—Feb. 8, 2022.

* cited by examiner

| | |
|---|---|
| P/N | Resource Information Bit Map |
| Resource Information Bit Map | |

Octet 1

•
•
•

| | |
|---|---|
| Resource Information Bit Map | |
| Resource Information Bit Map | RSRP |

Octet N

400

504

T1

506

T2

502

Resource
Selection

— Candidate resource set 508

— Selected resource for
transmission 510

500

T_reselect

602

604

606

608

Send self-reservation for future resource

Receive pre-emption or pre-collision

Re-send self-reservation for future resource

Transmit on re-selected resources

600

652

654

656

Send self-reservation for future resource

Receive sidelink control information or reservation information

Transmit on initially selected resources

650

710　　　　　　720　　　　　　715

705

700

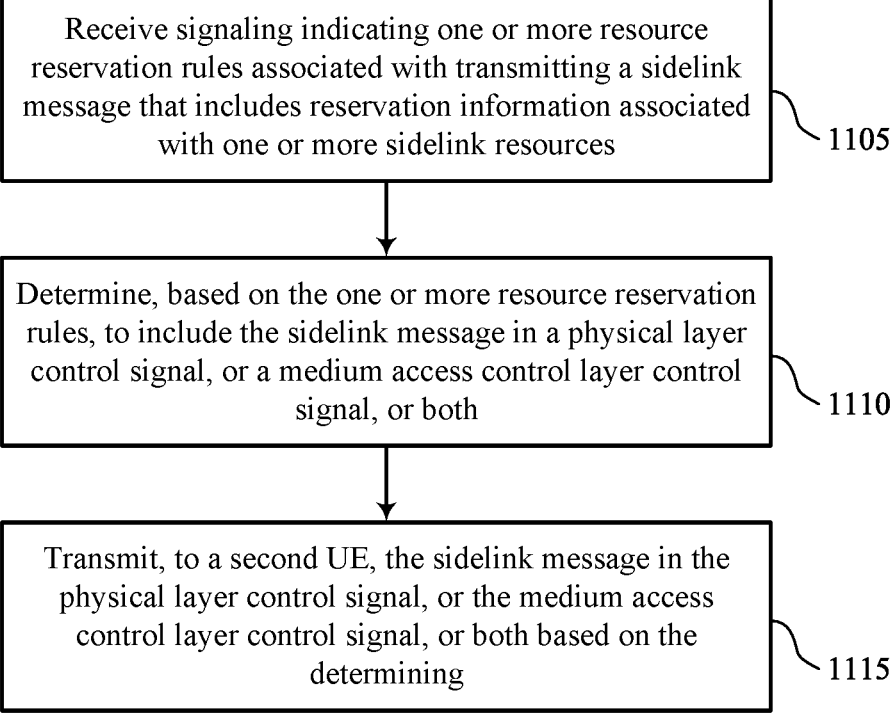

Receive signaling indicating one or more resource reservation rules associated with transmitting a sidelink message that includes reservation information associated with one or more sidelink resources

1105

Determine, based on the one or more resource reservation rules, to include the sidelink message in a physical layer control signal, or a medium access control layer control signal, or both

1110

Transmit, to a second UE, the sidelink message in the physical layer control signal, or the medium access control layer control signal, or both based on the determining

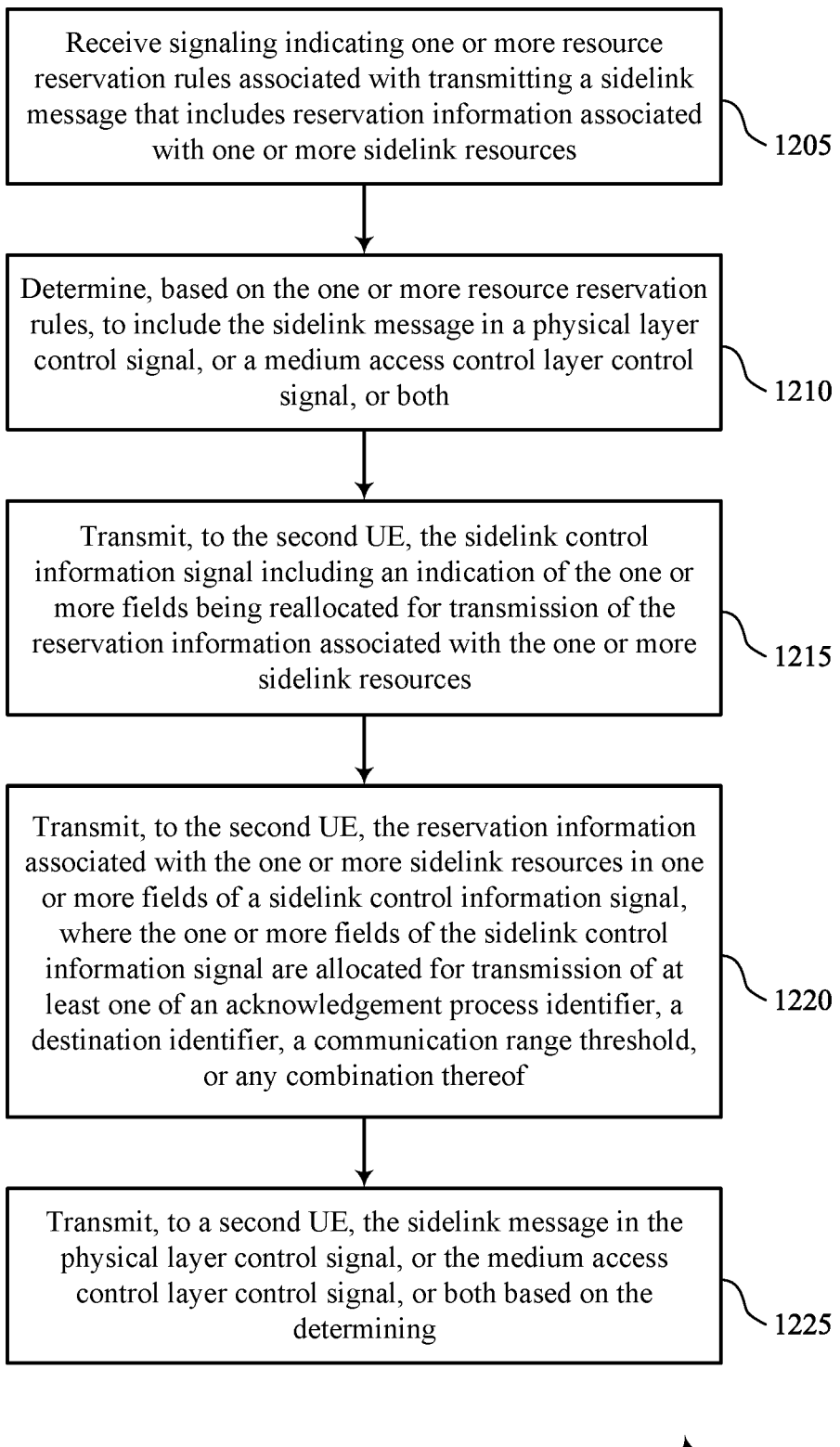

Receive signaling indicating one or more resource reservation rules associated with transmitting a sidelink message that includes reservation information associated with one or more sidelink resources

1205

Determine, based on the one or more resource reservation rules, to include the sidelink message in a physical layer control signal, or a medium access control layer control signal, or both

1210

Transmit, to the second UE, the sidelink control information signal including an indication of the one or more fields being reallocated for transmission of the reservation information associated with the one or more sidelink resources

1215

Transmit, to the second UE, the reservation information associated with the one or more sidelink resources in one or more fields of a sidelink control information signal, where the one or more fields of the sidelink control information signal are allocated for transmission of at least one of an acknowledgement process identifier, a destination identifier, a communication range threshold, or any combination thereof

1220

Transmit, to a second UE, the sidelink message in the physical layer control signal, or the medium access control layer control signal, or both based on the determining

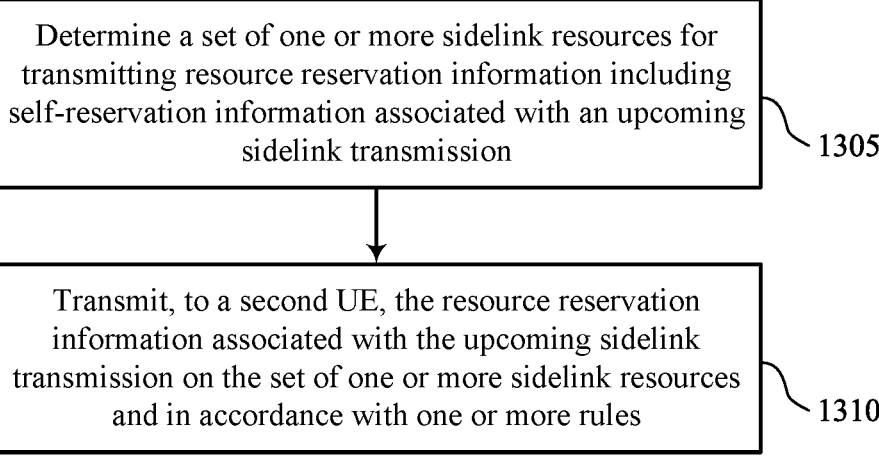

Determine a set of one or more sidelink resources for transmitting resource reservation information including self-reservation information associated with an upcoming sidelink transmission

1305

Transmit, to a second UE, the resource reservation information associated with the upcoming sidelink transmission on the set of one or more sidelink resources and in accordance with one or more rules

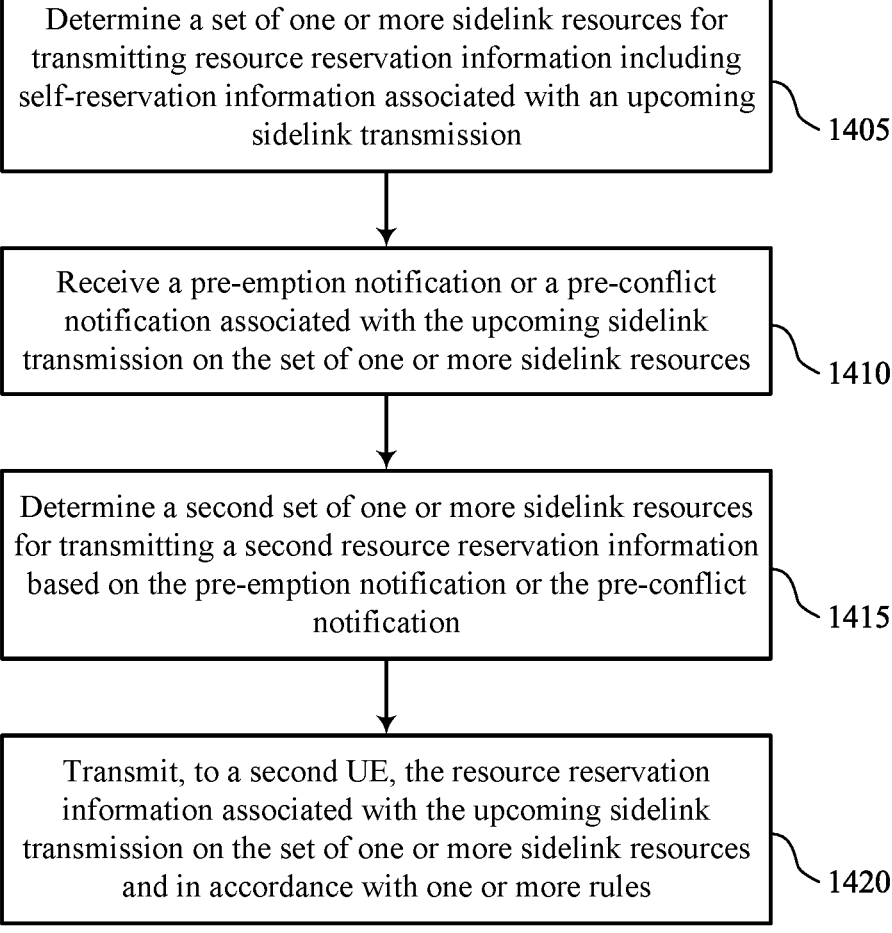

Determine a set of one or more sidelink resources for transmitting resource reservation information including self-reservation information associated with an upcoming sidelink transmission
1405

Receive a pre-emption notification or a pre-conflict notification associated with the upcoming sidelink transmission on the set of one or more sidelink resources
1410

Determine a second set of one or more sidelink resources for transmitting a second resource reservation information based on the pre-emption notification or the pre-conflict notification
1415

Transmit, to a second UE, the resource reservation information associated with the upcoming sidelink transmission on the set of one or more sidelink resources and in accordance with one or more rules
1420

SIGNALING RESOURCE INFORMATION FOR SIDELINK RELIABILITY

FIELD OF TECHNOLOGY

The present Application is a 371 national stage filing of International PCT Application No. PCT/CN2021/110747 by Dutta et al. entitled "SIGNALING RESOURCE INFORMATION FOR SIDELINK RELIABILITY," filed Aug. 5, 2021, which is assigned to the assignee hereof, and which is expressly incorporated by reference in its entirety herein.

FIELD OF TECHNOLOGY

The following relates to wireless communications, including signaling resource information for sidelink reliability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications devices, sidelink communication techniques may be deficient.

SUMMARY

The described techniques relate to improved methods, systems, devices, and apparatuses that support signaling resource information for sidelink reliability. Generally, the described techniques provide for techniques for a user equipment (UE) to send resource reservation information to other UEs. A transmitting UE may select resources for a sidelink transmission and may broadcast a self-reservation message to indicate that the selected resources are reserved by the transmitting UE. In some examples, the transmitting UE may receive a resource reservation rule associated with transmitting a sidelink message indicating the reservation information associated with the sidelink resources. The transmitting UE may then determine whether to include the reservation information in a physical layer control signal or a medium access control layer control signal or both, based on the resource reservation rule. The transmitting UE may then transmit, to a receiving UE, the sidelink message in the physical layer control signal, or the medium access control layer control signal, or both based on the determining.

A method for wireless communications at a first user equipment (UE) is described. The method may include receiving signaling indicating one or more resource reservation rules associated with transmitting a sidelink message that includes reservation information associated with one or more sidelink resources, determining, based on the one or more resource reservation rules, to include the sidelink message in a physical layer control signal, or a medium access control layer control signal, or both, and transmitting, to a second UE, the sidelink message in the physical layer control signal, or the medium access control layer control signal, or both based on the determining.

An apparatus for wireless communications at a first UE is described. The apparatus may include a processor, memory coupled with the processor, and instructions stored in the memory. The instructions may be executable by the processor to cause the apparatus to receive signaling indicating one or more resource reservation rules associated with transmitting a sidelink message that includes reservation information associated with one or more sidelink resources, determine, based on the one or more resource reservation rules, to include the sidelink message in a physical layer control signal, or a medium access control layer control signal, or both, and transmit, to a second UE, the sidelink message in the physical layer control signal, or the medium access control layer control signal, or both based on the determining.

Another apparatus for wireless communications at a first UE is described. The apparatus may include means for receiving signaling indicating one or more resource reservation rules associated with transmitting a sidelink message that includes reservation information associated with one or more sidelink resources, means for determining, based on the one or more resource reservation rules, to include the sidelink message in a physical layer control signal, or a medium access control layer control signal, or both, and means for transmitting, to a second UE, the sidelink message in the physical layer control signal, or the medium access control layer control signal, or both based on the determining.

A non-transitory computer-readable medium storing code for wireless communications at a first UE is described. The code may include instructions executable by a processor to receive signaling indicating one or more resource reservation rules associated with transmitting a sidelink message that includes reservation information associated with one or more sidelink resources, determine, based on the one or more resource reservation rules, to include the sidelink message in a physical layer control signal, or a medium access control layer control signal, or both, and transmit, to a second UE, the sidelink message in the physical layer control signal, or the medium access control layer control signal, or both based on the determining.

In some examples of the method, apparatuses, and non-transitory computer-readable medium described herein, transmitting the sidelink message in the physical layer control signal may include operations, features, means, or instructions for transmitting, to the second UE, the reservation information associated with the one or more sidelink resources in one or more fields of a sidelink control information signal, where the one or more fields of the sidelink control information signal may be allocated for transmission of at least one of an acknowledgement process identifier, a destination identifier, a communication range threshold, or any combination thereof.

Some examples of the method, apparatuses, and non-transitory computer-readable medium described herein may further include operations, features, means, or instructions for transmitting, to the second UE, the sidelink control information signal including an indication of the one or more fields being reallocated for transmission of the reservation information associated with the one or more sidelink resources.

In some examples of the method, apparatuses, and non-transitory computer-readable medium described herein, transmitting the sidelink message in the physical layer control signal may include operations, features, means, or instructions for transmitting, to the second UE, a first message associated with a sidelink control information, the first message indicating that a second message associated with the sidelink control information includes the reservation information associated with the one or more sidelink resources and transmitting, to the second UE, the second message associated with the sidelink control information.

In some examples of the method, apparatuses, and non-transitory computer-readable medium described herein, the second message associated with the sidelink control information includes at least one of a set of one or more bits indicating information related to the one or more sidelink resources, a list of bits indicating the information related to the one or more sidelink resources, a set of one or more bits indicating a reference signal received power, a set of one or more bits indicating hop count, a set of one or more bits indicating a distance, a bit indicating a preference level associated to the one or more sidelink resources, or any combination thereof.

In some examples of the method, apparatuses, and non-transitory computer-readable medium described herein, transmitting the sidelink message in the medium access control layer control signal may include operations, features, means, or instructions for transmitting, to the second UE, the reservation information associated with the one or more sidelink resources in a medium access control layer control element.

In some examples of the method, apparatuses, and non-transitory computer-readable medium described herein, the medium access control layer control element includes at least one of a set of one or more bits indicating a time-resource assignment, a bit indicating a preference level associated to the one or more sidelink resources, a set of one or more bits indicating hop count, a set of one or more bits indicating a reference signal received power, a set of one or more bits indicating a distance to originator, set of one or more bits indicating a distance to a last hop, a set of one or more bits indicating a zone identifier associated with the originator, a set of one or more bits indicating a periodicity of reservation, or any combination thereof.

In some examples of the method, apparatuses, and non-transitory computer-readable medium described herein, transmitting the sidelink message in the medium access control layer control signal may include operations, features, means, or instructions for transmitting, to the second UE, the reservation information associated with the one or more sidelink resources in one or more bitmaps included in a physical layer control signal or a medium access control layer control element.

In some examples of the method, apparatuses, and non-transitory computer-readable medium described herein, the one or more bitmaps include at least one of a bit indicating a preference level associated to the one or more sidelink resources, a set of one or more bits corresponding to a set of one or more time and frequency resources allocated to future time periods, a set of one or more bits indicating a reference signal received power level, a set of one or more bits indicating a reference signal received power, or any combination thereof.

Some examples of the method, apparatuses, and non-transitory computer-readable medium described herein may further include operations, features, means, or instructions for transmitting, to the second UE, an indication of an information sharing format in a sub-header of the medium access control layer control element, where transmitting the one or more bitmaps may be based on the information sharing format.

In some examples of the method, apparatuses, and non-transitory computer-readable medium described herein, transmitting the sidelink message in the physical layer control signal and the medium access control layer control signal may include operations, features, means, or instructions for transmitting, to the second UE, a first portion of the reservation information associated with the one or more sidelink resources in a sidelink control information signal and a second portion of the reservation information associated with the one or more sidelink resources in a medium access control layer control element.

In some examples of the method, apparatuses, and non-transitory computer-readable medium described herein, the first portion of the reservation information associated with the one or more sidelink resources includes at least one of a self-reservation information, reservation information associated with an upcoming transmission, reservation information associated with a high priority transmission, reservation information associated with a collision detection, reservation information associated with a reference signal received power level greater than a threshold, or any combination thereof.

A method for wireless communications at a first UE is described. The method may include determining a set of one or more sidelink resources for transmitting resource reservation information including self-reservation information associated with an upcoming sidelink transmission and transmitting, to a second UE, the resource reservation information associated with the upcoming sidelink transmission on the set of one or more sidelink resources and in accordance with one or more rules.

An apparatus for wireless communications at a first UE is described. The apparatus may include a processor, memory coupled with the processor, and instructions stored in the memory. The instructions may be executable by the processor to cause the apparatus to determine a set of one or more sidelink resources for transmitting resource reservation information including self-reservation information associated with an upcoming sidelink transmission and transmit, to a second UE, the resource reservation information associated with the upcoming sidelink transmission on the set of one or more sidelink resources and in accordance with one or more rules.

Another apparatus for wireless communications at a first UE is described. The apparatus may include means for determining a set of one or more sidelink resources for transmitting resource reservation information including self-reservation information associated with an upcoming sidelink transmission and means for transmitting, to a second UE, the resource reservation information associated with the upcoming sidelink transmission on the set of one or more sidelink resources and in accordance with one or more rules.

A non-transitory computer-readable medium storing code for wireless communications at a first UE is described. The code may include instructions executable by a processor to determine a set of one or more sidelink resources for transmitting resource reservation information including self-reservation information associated with an upcoming sidelink transmission and transmit, to a second UE, the resource reservation information associated with the upcoming side-link transmission on the set of one or more sidelink resources and in accordance with one or more rules.

In some examples of the method, apparatuses, and non-transitory computer-readable medium described herein, transmitting the resource reservation information may include operations, features, means, or instructions for trans-mitting, to the second UE, the resource reservation infor-mation after a first transmission of a data packet or prior to at least one of the first transmission of the data packet, each transmission of the data packet, each re-transmission of the data packet, a set of one or more transmissions of the data packet, a set of one or more re-transmissions of the data packet, each transmission of an unreserved data packet, each re-transmission of the unreserved data packet, or any com-bination thereof.

In some examples of the method, apparatuses, and non-transitory computer-readable medium described herein, transmitting the resource reservation information may include operations, features, means, or instructions for trans-mitting, to the second UE, the resource reservation infor-mation based on at least one of feedback information, a conflict notification, reservation information received from one or more UEs, or any combination thereof.

Some examples of the method, apparatuses, and non-transitory computer-readable medium described herein may further include operations, features, means, or instructions for determining that the upcoming sidelink transmission may be associated with a priority greater than a threshold, where transmitting the resource reservation information associated with the upcoming sidelink transmission may be based on the determining.

Some examples of the method, apparatuses, and non-transitory computer-readable medium described herein may further include operations, features, means, or instructions for determining a likelihood of conflict for the upcoming sidelink transmission may be based on at least one of a set of multiple prior re-transmissions, a packet loss statistic, a channel busy ratio, or any combination thereof, where transmitting the resource reservation information associated with the upcoming sidelink transmission may be based on the determining.

Some examples of the method, apparatuses, and non-transitory computer-readable medium described herein may further include operations, features, means, or instructions for determining that the upcoming sidelink transmission may be associated with a delay budget less than a threshold, where transmitting the resource reservation information associated with the upcoming sidelink transmission may be based on the determining.

Some examples of the method, apparatuses, and non-transitory computer-readable medium described herein may further include operations, features, means, or instructions for receiving a set of multiple collision notifications from one or more neighboring UEs, where transmitting the resource reservation information associated with the upcom-ing sidelink transmission may be based on receiving the set of multiple collision notifications.

In some examples of the method, apparatuses, and non-transitory computer-readable medium described herein, the one or more rules indicate that the resource reservation information may be re-transmitted for a threshold number of transmissions, and the threshold number of transmissions may be determined based on at least one of a delay budget, a processing time, a channel congestion, or any combination thereof.

In some examples of the method, apparatuses, and non-transitory computer-readable medium described herein, determining the set of one or more sidelink resources may include operations, features, means, or instructions for deter-mining the set of one or more sidelink resources based on at least one of sensing information, one or more configured resources, a time to process and generate a resource for-warding message, a time for a receiver to decode and process the resource forwarding message, or any combina-tion thereof.

In some examples of the method, apparatuses, and non-transitory computer-readable medium described herein, determining the set of one or more sidelink resources may include operations, features, means, or instructions for deter-mining the set of one or more sidelink resources based on removing at least one sidelink resource from the set of one or more sidelink resources, where a transmission or recep-tion may be scheduled for a time period associated with the at least one sidelink resource. In some examples of the method, apparatuses, and non-transitory computer-readable medium described herein, the one or more rules indicate that a second resource reservation information may be transmit-ted a threshold time period after transmission of the resource reservation information.

Some examples of the method, apparatuses, and non-transitory computer-readable medium described herein may further include operations, features, means, or instructions for receiving a pre-emption notification associated with the upcoming sidelink transmission on the set of one or more sidelink resources and determining a second set of one or more sidelink resources for transmitting a second resource reservation information based on the pre-emption notifica-tion.

Some examples of the method, apparatuses, and non-transitory computer-readable medium described herein may further include operations, features, means, or instructions for receiving, from a third UE, a pre-conflict notification associated with the upcoming sidelink transmission on the set of one or more sidelink resources and determining a second set of one or more sidelink resources for transmitting a second resource reservation information based on the pre-conflict notification.

Some examples of the method, apparatuses, and non-transitory computer-readable medium described herein may further include operations, features, means, or instructions for receiving a resource overlap notification associated with the upcoming sidelink transmission on the set of one or more sidelink resources, where transmitting the resource reserva-tion information may be based on receiving the resource overlap notification.

BRIEF DESCRIPTION OF THE DRAWINGS

FIGS. 11 through 14 show flowcharts illustrating methods that support signaling resource information for sidelink reliability in accordance with aspects of the present disclosure.

DETAILED DESCRIPTION

Figure 1:
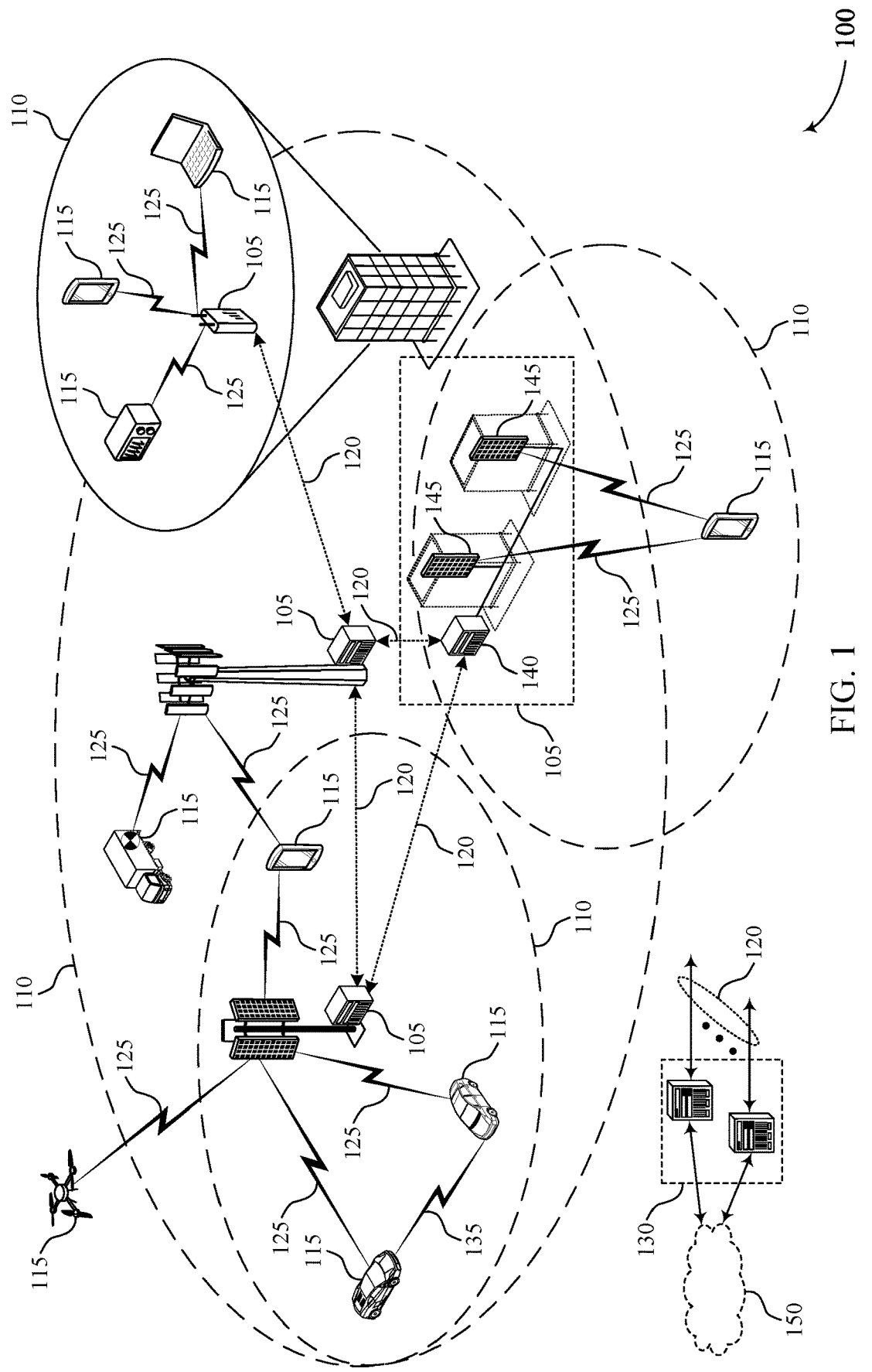
FIG. 1 illustrates an example of a wireless communica-tions system that supports signaling resource information for sidelink reliability in accordance with aspects of the present disclosure.

A wireless communications system may support both access links and sidelinks for communications between one or more communication devices. An access link may refer to a communication link between a UE and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and one or more other UEs within a coverage area. In some examples, the coverage area may include the group of UEs (e.g., a coverage area provided by a base station, a coverage area outside of the coverage area provided by the base station, or a combination thereof). One or more of the UEs in the group of UEs may initiate sidelink communications with other UEs in the group of UEs. In some examples, V2X communication may support two modes of resource allocation mechanism. In a first mode of operation (e.g., Mode 1), resources may be scheduled by a base station. In a second mode of operation (e.g., Mode 2), base stations may not be involved in sidelink communications and a UE may perform autonomous resource selection. For example, a UE may reserve a set of resources without a base station allocating resources to UEs participating in sidelink communications. In the second mode of operation (e.g., mode 2), each transmitting UE performs a sensing operation to find occupied or available resources for its own transmission. Additionally or alternatively, when transmitting in a current slot, a transmitting UE may reserve a number of resources in a number of future slots. A transmitting UE may select resources for a sidelink transmission and broadcasts a self-reservation message to indicate that the selected resources are reserved by the transmitting UE. However, the self-reservation message may not be received by all other nearby UEs due to interference. As such, some UEs that receive the reservation message may forward the indication of the reserved resources to other UEs. Aspects depicted herein depict techniques for sending the resource reservation information. In addition, aspects depicted herein provide for a UE to pre-reserve resources including self-reservation resources.

According to aspects depicted herein, a first UE may transmit reservation resource information to other UEs according to one or more resource reservation rules. The first UE may receive a resource reservation rule associated with transmitting a sidelink message indicating reservation information associated with sidelink resources. The first UE then determines whether to include the reservation information in a physical layer control signal or a medium access control layer control signal or both. In some examples, the first UE may include the reservation information in a sidelink control information. Additionally or alternatively, the first UE may use a bitmap in the medium access control layer control element to indicate the reservation information.

According to aspects depicted herein, a first UE may reserve sidelink resources and transmit or re-transmit reservation information including self-reservation information on the reserved sidelink resources. The first UE may transmit the self-reservation information based on one or more rules. In some examples, the one or more rules may define the location of transmitting the self-reservation information. Additionally or alternatively, the one or more rules may define that self-reservation information is transmitted if a priority associated with a transmission is greater than a threshold priority. In some examples, the first UE may receive a pre-emption notification or a pre-conflict notification and the first UE may then determine a set of one or more sidelink resources for transmitting another resource reservation information based on the pre-emption notification.

UEs supporting signaling resource information for sidelink reliability in sidelink communications systems may utilize the techniques described herein to experience power savings and extended battery life while ensuring reliable and efficient communications in the group of UEs. Particular aspects of the subject matter described in this disclosure may be implemented to support high reliability and low latency communications, among other examples. The described techniques may thus include features for improvements to power consumption, spectral efficiency, higher data rates and, in some examples, may promote efficiency for high reliability and low latency operations, among other benefits.

Aspects of the disclosure are initially described in the context of wireless communications systems. Aspects of the disclosure are further described in the context of a medium access control layer control element, a resource configuration, and resource selection configurations. Aspects of the disclosure are further illustrated by and described with reference to apparatus diagrams, system diagrams, and flowcharts that relate to signaling resource information for sidelink reliability.

FIG. 1 illustrates an example of a wireless communications system 100 that supports signaling resource information for sidelink reliability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control layer may perform priority handling and multiplexing of logical channels into transport channels. The medium access control layer may also use error detection techniques, error correction techniques, or both to support retransmissions at the medium access control layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, a first UE 115 may receive signaling indicating one or more resource reservation rules associated with transmitting a sidelink message that includes reservation information associated with one or more sidelink resources. The first UE 115 determine, based on the one or more resource reservation rules, to include the sidelink message in a physical layer control signal, or a medium access control layer control signal, or both. Upon determining, the first UE 115 may transmit, to a second UE 115, the sidelink message in the physical layer control signal, or the medium access control layer control signal, or both.

According to one or more aspects of the present disclosure, a first UE 115 may determine a set of one or more sidelink resources for transmitting resource reservation information including self-reservation information associated with an upcoming sidelink transmission. The first UE 115 may transmit, to a second UE 115, the resource reservation information associated with the upcoming sidelink transmission on the set of one or more sidelink resources and in accordance with one or more rules.

Figure 2:
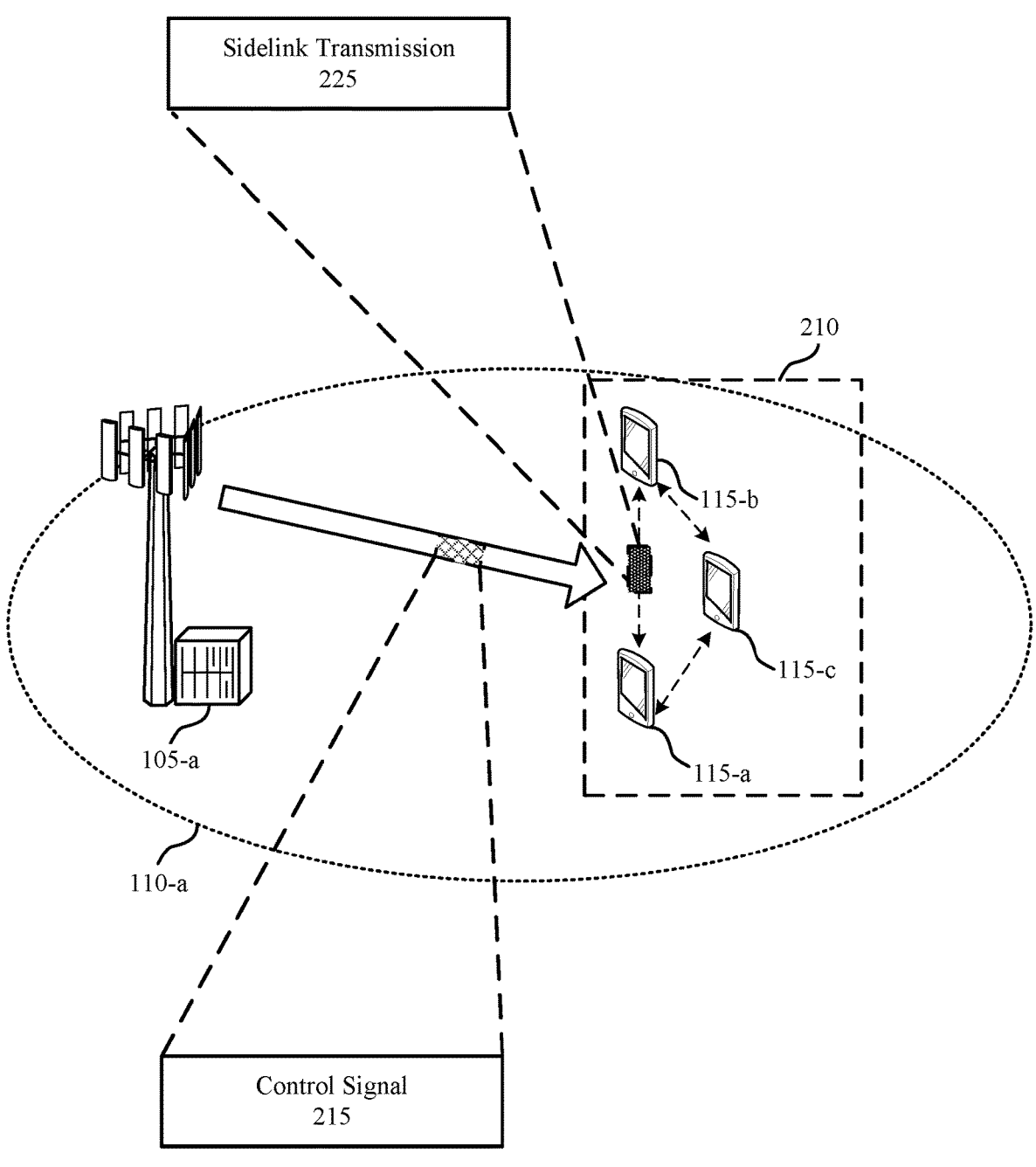
FIG. 2 illustrates an example of a wireless communica-tions system that supports signaling resource information for sidelink reliability in accordance with aspects of the present disclosure.

FIG. 2 illustrates an example of a wireless communications system 200 that supports signaling resource information for sidelink reliability in accordance with aspects of the present disclosure. In some examples, the wireless communications system 200 may implement aspects of wireless communications system 100. The wireless communications system 200 includes a base station 105-*a*, a geographic coverage area 110-*a*, and one or more UEs 115 (may also be referred to as devices).

In some examples, the wireless communications system 200 may utilize control signaling to schedule resources for the UEs 115 to perform sidelink communications. Additionally or alternatively, the UEs 115 in the wireless communications system 200 may utilize shared information to enhance scheduling, inter-UE coordination, and communications flexibility. In some examples, the group of UEs 115 (for example, UE 115-*a* (UE 1), UE 115-*b* (UE 2), and UE 115-*c* (UE 3)) may communicate with each other (for example, within a V2X system, a D2D system, among other examples) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 115 (such as, UE 115-*a*, UE 115-*b* and UE 115-*c*) and a base station 105-*a*. A sidelink may refer to any communication link between similar wireless devices (for example, a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

The base station 105-*a* may communicate with one or more UEs 115 (for example, UEs 115-*a*, UE 115-*b*, and UE 115-*c*), which may be included within a UE group 210. For example, the base station 105-*a* may transmit a control signal 215 to the UE 115-*a* (UE 1), the UE 115-*b* (UE 2), or the UE 115-*c* (UE 3). As depicted in the example of FIG. 2, the UE 115-*a*, the UE 115-*b*, and the UE 115-*c* may communicate with each other (or with another group of UEs 115) over sidelink communications (for example, using a peer-to-peer (P2P) or D2D protocol). In some examples, the UE 115-*a* may transmit sidelink transmissions to the UE 115-*b* or the UE 115-*c*. In some examples, the UE 115-*a* or the UE 115-*b* may monitor resource pools for the sidelink communications or indications of the sidelink communications (for example, resource reservations, control channel transmissions, among other examples) from other UEs 115 in the group. Additionally or alternatively, the UEs 115 may have data to transmit to (or receive from) a UE 115 in the UE group 210 and may use the sidelink communications to transmit the data transmission. In some examples, the UE group 210 of the UEs 115 may utilize sidelinks communications in addition to access links with the base station 105-*a*.

As depicted herein, sidelink communications may support communications within a group of UEs 115 (for example, UE group 210). For instance, sidelink communications may include communications between a UE (such as, UE 115-*a*, UE 115-*b*, and UE 115-*c*) and other UEs 115 within a coverage area including the group of UEs (for example, a coverage area provided by a base station, a coverage area outside of the coverage area provided by the base station, or a combination thereof). A UE 115 in the group of UEs 115 may initiate sidelink communications with other UEs in the group of UEs. For example, the UEs 115 may be in a coverage area 110-*a* (for example, a coverage area 110 with reference to FIG. 1) of the base station 105-*a*. In such examples, a UE 115 may communicate with the base station 105-*a* via a Uu interface (for example, the base station 105-*a* may transmit downlink communications to the UE 115 via an access link). In some other examples, the group of UEs 115 may not be inside the coverage area or may not communicate with the base station 105-*a* using an access link.

In some examples, the UE 115 (such as, UE 115-*a*, UE 115-*b*, and UE 115-*c*) may have information (for example, a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE. In some examples, the base station 105-*a* may configure sidelink communication resources for the group of UEs using a configuration message (for example, semi-persistent scheduling configuration message). In some examples, the base station 105-*a* may communicate the control signal 215 indicating a resource allocation for the UEs included in the group of UEs.

In resource allocation mode 2, a UE 115 (e.g., UE 115-*a*, UE 115-*b*, or UE 115-*c*) may determine a set of candidate resources. The UE 115 may continuously decode sidelink control information from peer UEs. The sidelink control information may include reservation information (e.g., resources, such as slots and resource blocks) from peer UEs to use in future. If a peer UE transmitting the sidelink control information has a high reference signal received power, then a receiving UE may determine that there is a UE located close to the receiving UE providing a high interference for the receiving UE. In some examples, the receiving UE may remove all resources indicated in a corresponding sidelink control information from the candidate set. The receiving UE may randomly select N resources for transmitting or re-transmitting a transport block. For every transmission, the receiving UE may reserve resources for up to 2 re-transmissions in the future.

In some wireless communications systems, a UE 115 may experience a loss in reliability due to interference. The causes of loss in reliability may be because the first transmission is unprotected, there is a collision with another transmission, there is a half-duplex loss where one or more intended receivers also transmit at the same slot, there are link quality issues (non-line of sight, large distance between transmitter and receiver, etc.). In some wireless communications systems, a UE 115 from the group of UEs 210 may be allowed to select sidelink transmission resources. In some examples, the wireless communications system 200 may support two modes of resource allocation mechanism: Mode 1 (in which the resource is scheduled by a base station) and Mode 2 (in which the UE performs an autonomous resource selection). In the example of Mode 2 operation, each transmitting UE may perform a sensing operation to find occupied or available resources for transmission. For example, devices (receivers and transmitters) may perform a sensing operation before transmitting. In the example of Mode 2 operation, a transmitter device (for example, UE 115-a or UE 1) may schedule resources for receiver devices (for example, UE 115-b or UE 2). In particular, each transmitting UE (for example, UE 115-a or UE 1) may perform a sensing operation to find occupied or available resources for its own transmission.

Some wireless communications systems may support three types of sets of resources for inter-UE coordination in Mode 2 operation. In Type A, a first UE 115 may send to a second UE 115, the set of resources preferred for the second UE's transmission (e.g., based on its sensing result). In Type B, the first UE 115 may send to the second UE 115, the set of resources not preferred for the second UE's transmission (e.g., based on its sensing result or expected or potential resource conflict). In Type C, the first UE 115 may send to the second UE 115, the set of resource where the resource conflict is detected. Additionally or alternatively, the first UE 115 may determine the contents of the set of resources, including consideration of sidelink scheduling. In some examples, the first UE 115 may determine when to send the set of resources to the second UE 115 (including which UE sends it).

In some examples, conflict may be detected between a first UE 115 and a second UE 115 due to a third UE 115. In some examples, the first UE 115 or the second UE 115 may send an indication before the conflict event (pre-conflict) based on future reservation information. Such indication transmission technique may be applicable for groupcast and unicast. In some examples, the first UE 115 or the second UE 115 may send the indication after the conflict event (post-conflict) based on decoding the current transmissions in conflict (applicable for groupcast communications). In some aspects, a first UE 115 may send to a second UE 115, one or a set of resources to use or avoid during communications. A receiving UE may forward the reservation information sent by an interferer UE to its transmitting UE. The transmitting UE on receiving this information can select an appropriate resource that does not create a conflict.

One or more aspects of the present disclosure provide for techniques for sending the resource reservation information. In addition, aspects depicted herein describe techniques for a UE to pre-reserve resources or re-transmit self-reservation resources. According to one or more aspects, a first UE 115-a may receive signaling indicating one or more resource reservation rules associated with transmitting a sidelink message that includes reservation information associated with one or more sidelink resources. For example, the base station 105-a may transmit the resource reservation rules in control signal 215. In some examples, the first UE 115-a may determine, based on the one or more resource reservation rules, to include the sidelink message in a physical layer control signal, or a medium access control layer control signal, or both. In some examples, the first UE 115-a may transmit, to a second UE 115-b, the sidelink message in the physical layer control signal, or the medium access control layer control signal, or both based on the determining.

In some examples, the first UE 115-a may signal the resource reservation information on stage-2 sidelink control information (SCI-2). The first UE 115-a may transmit, to the second UE 115-b, the reservation information associated with the one or more sidelink resources in one or more fields of a sidelink control information signal. In some examples, the one or more fields of the sidelink control information signal are allocated for transmission of at least one of an acknowledgement process identifier, a destination identifier, a communication range threshold, or any combination thereof. The size (i.e., number of bits of information) of SCI-2 may be limited and the first UE 115-a may use the available reserved bits for signaling of resource information (set of resources). In another case, the first UE 115-a may use a reserved bit and a part of the SCI-2 to signal the resource information. In this case, some of the fields in the SCI-2 may not be signaled for resource information sharing and can be pre-configured. For instance, the HARQ process identifier may be pre-configured for resource information sharing. In some examples, the destination identifier may be pre-configured for resource information sharing. Additionally or alternatively, the communication range threshold may not be signaled for resource information sharing. Thus, the first UE 115-a may transmit, to the second UE 115-b, the sidelink control information signal including an indication of the one or more fields being reallocated for transmission of the reservation information associated with the one or more sidelink resources. In some examples, an indication may be used to notify the receiver that the non-signaled fields are re-used for resource information sharing. A one-bit indication can be an additional bit in the SCI-2 (e.g., the first bit). In another case, the SCI-2 for resource information sharing may be defined as a new format and signaled in SCI-2. Additionally or alternatively, bits 10 and 11 may be used to signal the resource information sharing SCI-2 format. Additionally or alternatively, a first sidelink control information (e.g., SCI-1) may indicate this new format using a two-bit format field in a first sidelink control information (e.g., SCI-2) set to either 10 or 11.

In some examples, the first UE 115-a may transmit, to the second UE 115-b, a first message associated with a sidelink control information, the first message indicating that a second message associated with the sidelink control information includes the reservation information associated with the one or more sidelink resources. The first UE 115-a may then transmit, to the second UE 115-b, the second message associated with the sidelink control information. In some examples, the first UE 115-a may include 5 or 9 bits of reservation information (e.g., "time resource assignment" in SCI-1) in SCI-2 for resource information sharing. In another case, the first UE 115-a may include a list of multiple 5 or 9 bits of reservation information in SCI-2 for resource information sharing. Additionally or alternatively, the first UE 115-a may include N-bits to indicate the periodicity of the reservation (for reference signal received power reservations), or the reservation information may include additional bits indicating RSRP, or hop count, or distance or other parameters. In some instances, the first UE 115-a may use 1 bit to indicate if the resource signaled is a preferred or non-preferred resource. Thus, the second message associated with the sidelink control information may include at least one of a set of one or more bits indicating information related to the one or more sidelink resources, a list of bits indicating the information related to the one or more sidelink resources, a set of one or more bits indicating a reference signal received power, a set of one or more bits indicating hop count, a set of one or more bits indicating a distance, a bit indicating a preference level associated to the one or more sidelink resources, or any combination thereof.

According to one or more aspects of the present disclosure, the first UE 115-*a* may determine a set of one or more sidelink resources for transmitting resource reservation information including self-reservation information associated with an upcoming sidelink transmission. The first UE 115-*a* may then transmit, to the second UE 115-*b*, the resource reservation information associated with the upcoming sidelink transmission on the set of one or more sidelink resources and in accordance with one or more rules. Thus, the first UE 115-*a* may pre-reserve resources or re-transmit self-reservation resources to provide reliability gains.

Figure 3:
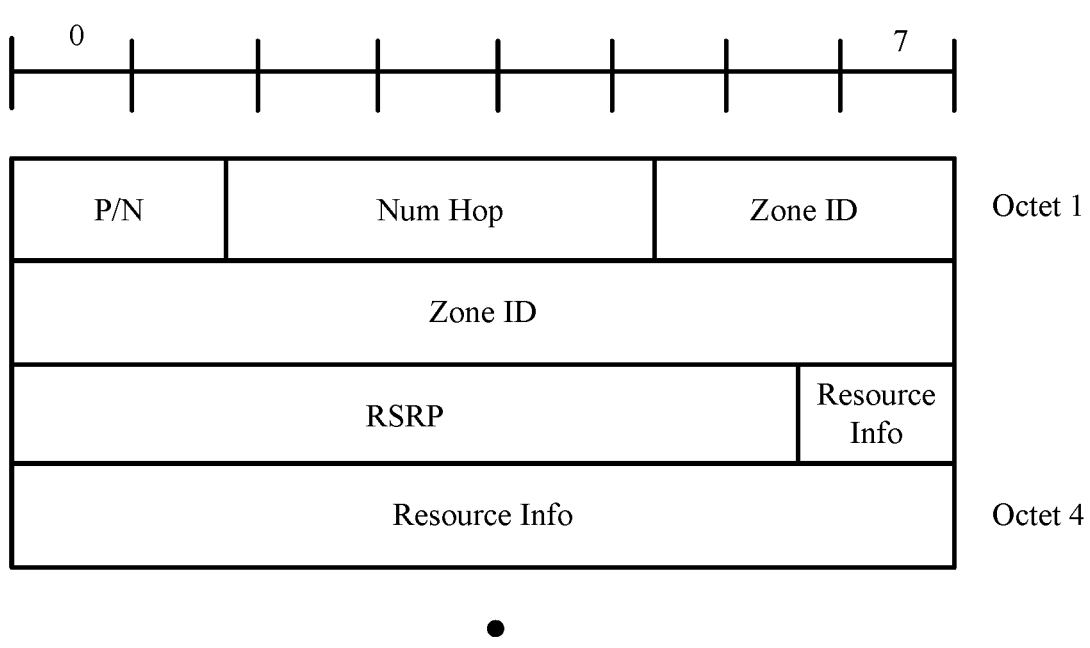
FIG. 3 illustrates an example of a medium access control layer control element that supports signaling resource infor-mation for sidelink reliability in accordance with aspects of the present disclosure.

FIG. 3 illustrates an example of a medium access control layer control element 300 that supports signaling resource information for sidelink reliability in accordance with aspects of the present disclosure. In some examples, the medium access control layer control element 300 may implement aspects of wireless communications system 100 or wireless communications system 200 as depicted with reference to FIGS. 1 and 2. The medium access control layer control element 300 may be transmitted by a UE 115 as described with reference to FIGS. 1 and 2.

According to one or more aspects, a first UE 115 may receive signaling indicating one or more resource reservation rules associated with transmitting a sidelink message that includes reservation information associated with one or more sidelink resources. The first UE 115 may determine, based on the one or more resource reservation rules, to include the sidelink message in a medium access control layer control signal. The first UE 115 may transmit, to a second UE 115, the reservation information associated with the one or more sidelink resources in a medium access control layer control element 300. The medium access control layer control element 300 may be defined for signaling resource information.

As depicted in the example of FIG. 3, the first UE 115 may transmit the medium access control layer control element 300 as octets. The medium access control layer control element 300 may include at least one of a set of one or more bits indicating a time-resource assignment, a bit indicating a preference level associated to the one or more sidelink resources, a set of one or more bits indicating hop count, a set of one or more bits indicating a reference signal received power, a set of one or more bits indicating a distance to originator, set of one or more bits indicating a distance to a last hop, a set of one or more bits indicating a location information (e.g., zone identifier) associated with the originator, a set of one or more bits indicating a periodicity of reservation, or any combination thereof. As depicted herein, the first UE 115 may transmit the medium access control layer control element 300 including 5 or 9 bits of time-resource assignment, 1 bit indicating preferred or non-preferred resources, 2-3 bits for hop count, quantized 6 or 7 bits of reference signal received power indication, 4 bits of a distance to the originator or last hop, 12 bits of zone identifier of the originator, and N-bits to indicate periodicity of the reservation (semi persistent scheduling).

Figure 4:
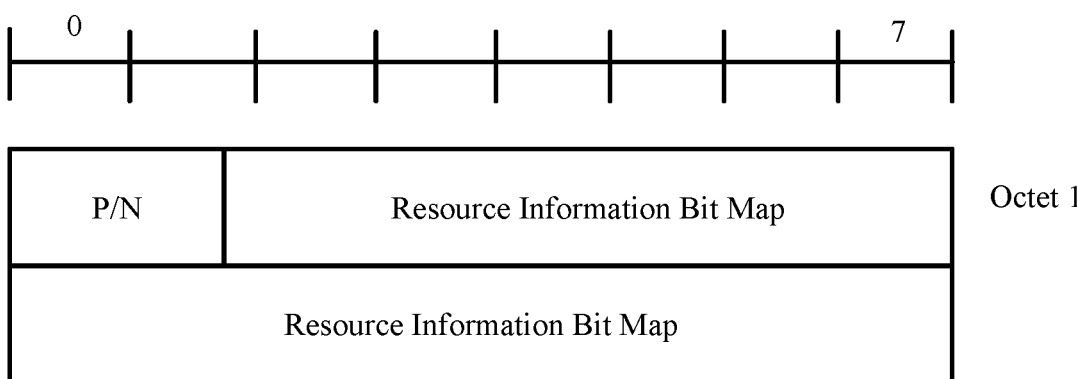
FIG. 4 illustrates an example of a medium access control layer control element that supports signaling resource information for sidelink reliability in accordance with aspects of the present disclosure.

FIG. 4 illustrates an example of a medium access control layer control element 400 that supports signaling resource information for sidelink reliability in accordance with aspects of the present disclosure. In some examples, the medium access control layer control element 400 may implement aspects of wireless communications system 100 or wireless communications system 200 as depicted with reference to FIGS. 1 and 2. The medium access control layer control element 400 may be transmitted by a UE 115 as described with reference to FIGS. 1 and 2.

According to one or more aspects, a first UE 115 may receive signaling indicating one or more resource reservation rules associated with transmitting a sidelink message that includes reservation information associated with one or more sidelink resources. According to the resource reservation rules, the first UE 115 may determine to include the sidelink message in a medium access control layer control signal. The first UE 115 may transmit, to a second UE 115, the reservation information associated with the one or more sidelink resources in one or more bitmaps included in a medium access control layer control element 400.

As depicted in the example of FIG. 4, the first UE 115 may transmit the medium access control layer control element 400 as octets. The bit map indicating the resource information (e.g., resource information bit map in the medium access control layer control element 400) may include 1 bit indicating preferred or non-preferred resources and N bits corresponding to N future time frequency resources. For instance, the first UE 115 may map subchannel index i of future TTI T_0+m to bit k=m+i. When total number of subchannel in the system is 10, the first UE 115 may use 20 bits to indicate resource information for 16 slots in the future. Additionally or alternatively, the medium access control layer control element 400 may include reserved bits or bits indicating reference signal received power level for non-preferred resources and reserved bits or bits indicating reservation periodicity. In some examples, the first UE 115 may use a list of bit maps where each element of the list corresponds to one reservation periodicity or may use a single bit map and indicate lowest common periodicity (e.g., if two periodicity 20 ms and 50 ms are indicated, the first UE 115 may signal 100 ms period). As depicted in the example of FIG. 4, the first UE 115 may transmit the reservation information associated with the one or more sidelink resources in one or more bitmaps. The one or more bitmaps may include at least one of a bit indicating a preference level associated to the one or more sidelink resources, a set of one or more bits corresponding to a set of one or more time and frequency resources allocated to future time periods, a set of one or more bits indicating a reference signal received power level, a set of one or more bits indicating a reference signal received power, or any combination thereof.

In some examples, the first UE 115 may transmit the reservation information associated with the one or more sidelink resources in one or more bitmaps included in a physical layer control signal or a medium access control layer control element. The format to be used may be configured or pre-configured or may be signaled over the medium access control layer control element sub-header. For example, the first UE 115 may transmit, to the second UE 115, an indication of an information sharing format in a sub-header of the medium access control layer control element 400. In some cases, transmitting the one or more bitmaps is based on the information sharing format.

According to one or more aspects depicted herein, the first UE 155 may determine to include resource forwarding information in both physical layer control signal (e.g., sidelink control information) or medium access control layer control element. The first UE 115 may transmit, to the second UE 115, a first portion of the reservation information associated with the one or more sidelink resources in a sidelink control information signal and a second portion of the reservation information associated with the one or more sidelink resources in a medium access control layer control element (e.g., medium access control layer control element 400).

The first UE 115 may apply one or more conditions to include a reservation information in the sidelink control information based on determining that the reservation information is a self-reservation information, or the reservation information is imminent (i.e., the transmission may occur before medium access control layer control element processing) or the reservation information is high priority (priority level >p0), or the reservation information is for a detected collision, or the reservation information is received with a high reference signal received power (reference signal received power >g0). For example, the first portion of the reservation information associated with the one or more sidelink resources may include at least one of a self-reservation information, reservation information associated with an upcoming transmission, reservation information associated with a high priority transmission, reservation information associated with a collision detection, reservation information associated with a reference signal received power level greater than a threshold, or any combination thereof.

The first UE 115 may progressively use one or multiple combinations of the criteria depicted herein to maximize the amount of information contained in the sidelink control information signal (e.g., SCI-2). In some examples, the first UE 115 may first transmit self-reservation resources, and then transmit reservations with imminent transmissions followed by reservations associated with K transmissions ordered by the reference signal received power, where K is determined by the space available in the sidelink control information signal (e.g., SCI-2). The first UE 115 may transmit the remaining portion of the reservation information in the medium access control layer control element (e.g., medium access control layer control element 400). As depicted herein, the signaling procedure and associated criteria may be a part of pre-configuration or configured by the network by RRC messaging.

Figure 5:
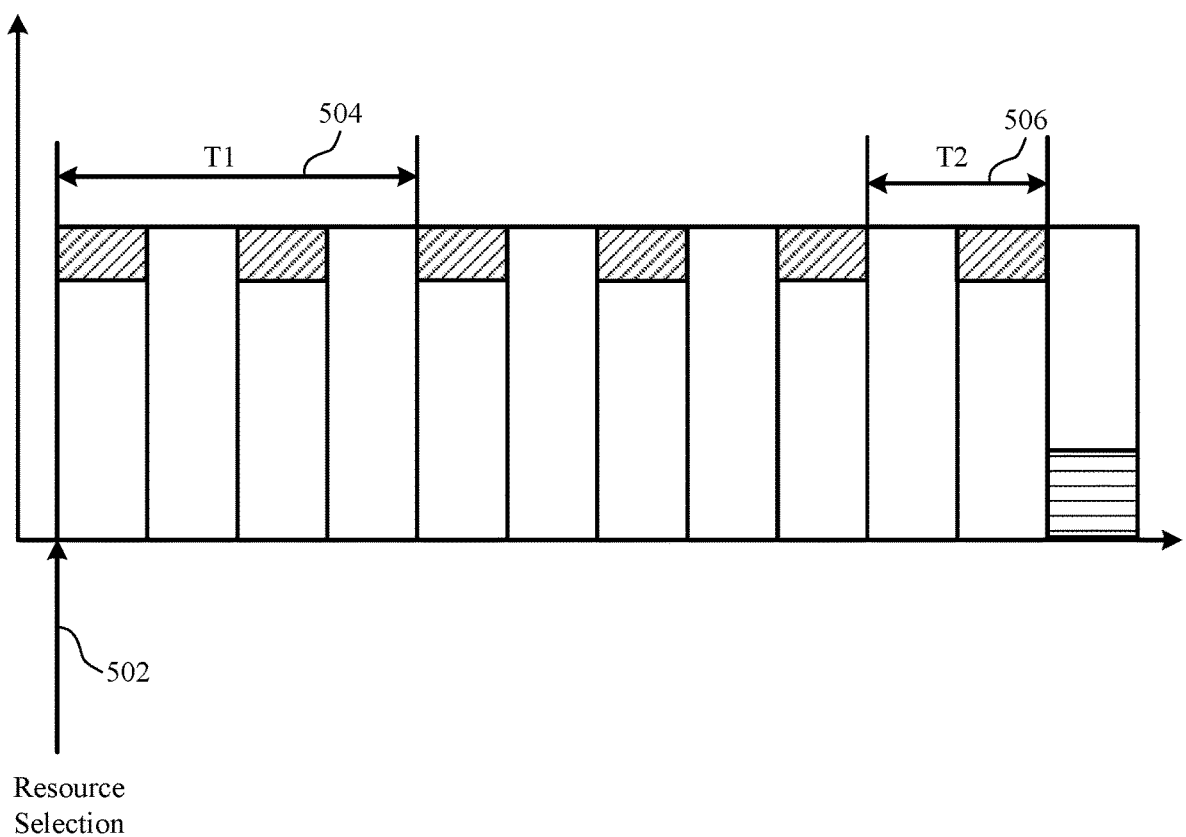
FIG. 5 illustrates an example of a resource configuration that supports signaling resource information for sidelink reliability in accordance with aspects of the present disclosure.
Figure 5:
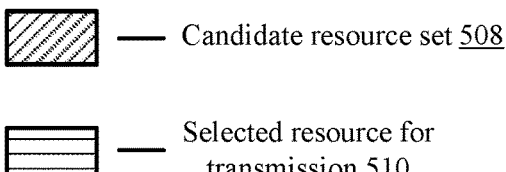
Figure 5:
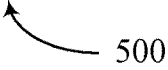

FIG. 5 illustrates an example of a resource configuration 500 that supports signaling resource information for sidelink reliability in accordance with aspects of the present disclosure. In some examples, the resource configuration 500 may implement aspects of wireless communications system 100 or wireless communications system 200 as depicted with reference to FIGS. 1 and 2. The resource configuration 500 may be implemented using a base station 105 and a UE 115 as described with reference to FIGS. 1 and 2.

A sidelink UE (e.g., a first UE) may receive a configuration for sharing coordination information. In some examples, a network entity (e.g., base station, roadside unit, leader UE) may transmit the configuration using RRC messages. In some examples, the configuration may be included in a RRC pre-configuration. The sidelink UE may be configured to either use a set of dedicated resources for sharing coordination information with other UEs. Alternatively, the sidelink UE may use contention based shared resources for sharing coordination information with other UEs or use both dedicated resources and contention-based resources.

According to one or more aspects, a first UE 115 may determine a set of one or more sidelink resources for transmitting resource reservation information including self-reservation information associated with an upcoming sidelink transmission. The first UE 115 may transmit, to a second UE 115, the resource reservation information associated with the upcoming sidelink transmission on the set of one or more sidelink resources and in accordance with one or more rules. In some examples, the first UE 115 may transmit the resource reservation information before the first transmission of the data packet (where the first transmission also includes the reservation), or before every transmissions or re-transmissions of a packet, or before the first N transmissions or re-transmissions of the packet where N may be configured, or before every transmissions or re-transmissions of a packet that is not reserved (either by prior transport block or prior transmission), or after the first transmission. In some examples, the decision to transmit self-reservation information may be based on a received feedback (ACK/NACK) or a received conflict notifications and reservation information.

Thus, the first UE 115 may transmit, to the second UE 115, the resource reservation information after a first transmission of a data packet or prior to at least one of the first transmission of the data packet, each transmission of the data packet, each re-transmission of the data packet, a set of one or more transmissions of the data packet, a set of one or more re-transmissions of the data packet, each transmission of an unreserved data packet, each re-transmission of the unreserved data packet, or any combination thereof. Additionally or alternatively, the first UE 115 may transmit, to the second UE 115, the resource reservation information based on at least one of feedback information, a conflict notification, reservation information received from one or more UEs, or any combination thereof.

In some examples, the first UE 115 may transmit resource reservation information including self-reservation information when the transmission is high priority (priority >p0), or when the first UE 115 determines from past transmissions that one or more link(s) have high chance of conflicts (based on past re-transmissions and packet loss statistics), channel busy ratio measurements. According to one or more aspects, the first UE 115 may determine that the upcoming sidelink transmission is associated with a priority greater than a threshold, where transmitting the resource reservation information associated with the upcoming sidelink transmission is based on the determining. Additionally or alternatively, the first UE 115 may determine that a likelihood of conflict for the upcoming sidelink transmission based on at least one of a set of prior re-transmissions, a packet loss statistic, a channel busy ratio, or any combination thereof, where transmitting the resource reservation information associated with the upcoming sidelink transmission is based on the determining. Additionally or alternatively, the first UE 115 may determine that the upcoming sidelink transmission is associated with a delay budget less than a threshold, where transmitting the resource reservation information associated with the upcoming sidelink transmission is based on the determining. For example, the first UE 115 may transmit resource reservation information including self-reservation information when the transmission has strict deadline value (delay budget <T ms).

In some examples, the first UE 115 may transmit resource reservation information including self-reservation information when one or multiple collision notifications are received from peers or neighboring devices. For instance, the first UE 115 may receive a set of collision notifications from one or more neighboring UEs, where transmitting the resource reservation information associated with the upcoming sidelink transmission is based on receiving the set of collision notifications. The first UE may be configured or pre-configured to transmit at most K re-transmissions of the self-reservation information per packet or transmission. The total number of re-transmissions may be determined by the UE based on the delay budget, or processing time, or channel congestion, or a combination thereof. For instance, K=4 may be set by higher layers, and the first UE 115 may transmit self-reservation once if there was not enough time between resource selection and transmission. In some examples, the one or more rules may indicate that the resource reservation information is re-transmitted for a threshold number of transmissions, and the threshold number of transmissions may be based on at least one of a delay budget, a processing time, a channel congestion, or any combination thereof.

In some examples, when dedicated resources are configured for resource information signaling or sharing. The first UE 115 (or the transmitter UE) may select candidate resources for self-reservation information signaling based on one or more pre-configured resources, or a time it takes to process and generate the resource forwarding message, or a time taken by a sidelink receiver UE to decode and process the message. The first UE 115 (or the transmitter UE) may remove a resource from this set of candidate resources if a reception is scheduled or expected in that time slot (TTI), or if a transmission is schedules in that time slot (TTI). In some examples, the first UE 115 may choose one or more resources from the candidate set. For instance, the first UE 115 may select the earliest resource, or may randomly select the resources.

As depicted in the example of FIG. 5, at 502, the first UE 115 may perform a resource selection procedure. The first UE 115 may identify the candidate resource set 508. In some examples, the first UE 115 may choose one or more resources (e.g., selected resource for transmission 510) from the candidate resource set 508 according to a configuration received from a base station. Additionally or alternatively, the first UE 115 may be preconfigured with one or more rules to identify the selected resource for transmission 510 from the candidate resource set 508. If the first UE 115 is transmitting self-reservation information on multiple occasions, the first UE 115 may be configured or pre-configured to have a minimum time gap between two successive transmissions of self-reservation information for a data packet. As depicted in the example of FIG. 5, the first UE 115 may select a resource for transmitting self-reservation information based on identifying a time gap T1 504 or a time gap T2 506. For example, the first UE 115 may identify selected resource for transmission 510 from the candidate resource set 508 if there is a minimum time gap of T2 506 after an instance of the candidate resource set 508. For instance, the first UE 115 may determine the set of one or more sidelink resources for transmitting resource reservation information including self-reservation information based on removing at least one sidelink resource from the set of one or more sidelink resources. A transmission or reception may be scheduled for a time period associated with the at least one sidelink resource. The one or more rules may indicate that a second resource reservation information is transmitted a threshold time period after transmission of the resource reservation information.

In some examples, when resource information signaling or sharing is configured on shared (non-dedicated) resources, the first UE 115 (or transmitter) may select candidate resources for resource reservation including self-reservation information signaling based on its sensing information (SCI and reservation information received), or a time it takes to process and generate the resource forwarding message, or a time taken by a sidelink receiver to decode and process this message. Thus, the first UE 115 may determine the set of one or more sidelink resources based on at least one of sensing information, one or more configured resources, a time to process and generate a resource forwarding message, a time for a receiver to decode and process the resource forwarding message, or any combination thereof. The first UE 115 may choose one or more resources from the candidate set. In some examples, the first UE 115 may use one or more rules to select an earliest resource, or may randomly select the resources. The one or more rules may be based on configuration received from upper layers or may be pre-configured.

Figures 6A, 6B:
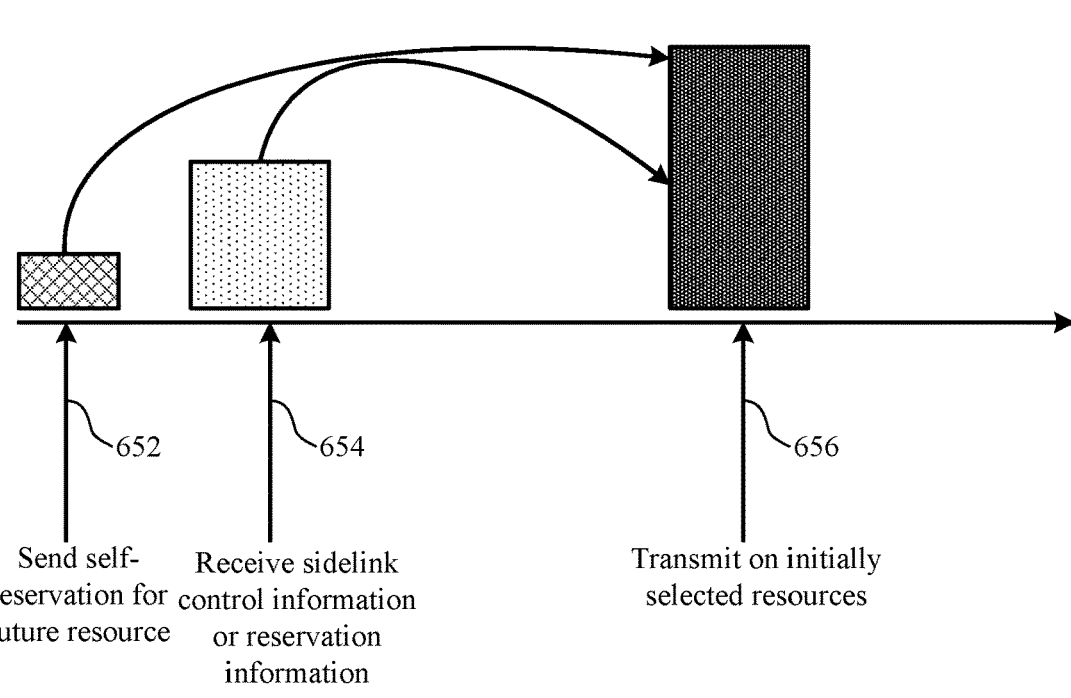
FIGS. 6A and 6B illustrate example of resource selection configurations that support signaling resource information for sidelink reliability in accordance with aspects of the present disclosure.

FIG. 6A illustrates an example of a resource selection configuration 600 that supports signaling resource information for sidelink reliability in accordance with aspects of the present disclosure. FIG. 6B illustrates an example of a resource selection configuration 650 that supports signaling resource information for sidelink reliability in accordance with aspects of the present disclosure. In some examples, the resource selection configuration 600 and the resource selection configuration 650 may implement aspects of wireless communications system 100 or wireless communications system 200 as depicted with reference to FIGS. 1 and 2. The resource selection configuration 600 and the resource selection configuration 650 may be implemented using a base station 105 and a UE 115 as described with reference to FIGS. 1 and 2.

A first UE 115 may determine a set of one or more sidelink resources for transmitting resource reservation information including self-reservation information associated with an upcoming sidelink transmission. The first UE 115 may then transmit, to a second UE 115, the resource reservation information associated with the upcoming sidelink transmission on the set of one or more sidelink resources and in accordance with one or more rules. In some examples, after transmitting the resource reservation information including the self-reservation information, the first UE 115 may receive a pre-emption notification (e.g., reservation by higher priority traffic). Upon receiving the pre-emption notification, the first UE 115 may re-select the sidelink resources and transmit a new self-reservation (if permitted by delay budget). In some examples, the first UE 115 may receive a pre-conflict notification (a third UE 115 indicating a collision between the first UE 115 and the second UE 115). In this case, the first UE 115 may re-select the sidelink resources and may transmit a new self-reservation if permitted by delay budget. Additionally or alternatively, the first UE 115 may receive a notification that an overlapping resource is being reserved by another UE (notified by SCI-2 or self-reservation or resource information forwarding message). In such cases, the first UE 115 may not re-select sidelink resources and may transmit the reservation information in the pre-reserved transmission opportunity.

The first UE 115 may receive a pre-emption notification associated with the upcoming sidelink transmission on the set of one or more sidelink resources and determine a second set of one or more sidelink resources for transmitting a second resource reservation information based on the pre-emption notification. Additionally or alternatively, the first UE 115 may receive, from a third UE 115, a pre-conflict notification associated with the upcoming sidelink transmission on the set of one or more sidelink resources and determine a second set of one or more sidelink resources for transmitting a second resource reservation information based on the pre-conflict notification. Additionally or alternatively, the first UE 115 may receive a resource overlap notification associated with the upcoming sidelink transmission on the set of one or more sidelink resources. In some examples, transmitting the resource reservation information is based on receiving the resource overlap notification.

As depicted in the example of FIG. 6A, at 602, the first UE 115 may send self-reservation message to reserve future resources. At 604, the first UE 115 may receive a pre-emption notification or a pre-conflict notification. Upon receiving the pre-emption notification, at 606, the first UE 115 may re-send a self-reservation message to reserve future resources. The first UE 115 may re-select the sidelink resources and transmit a new self-reservation message a time period (T_reselect) after receiving the pre-emption notification. At 608, the first UE 115 may transmit on the re-selected resources.

As depicted in the example of FIG. 6B, at 652, the first UE 115 may send self-reservation message to reserve future resources. At 654, the first UE 115 may receive an overlap notification. For example, the first UE 115 may receive a sidelink control information or a reservation information. Upon receiving a notification that an overlapping resource is being reserved by another UE, at 656, the first UE 115 may transmit on the initially selected resources.

Figure 7:
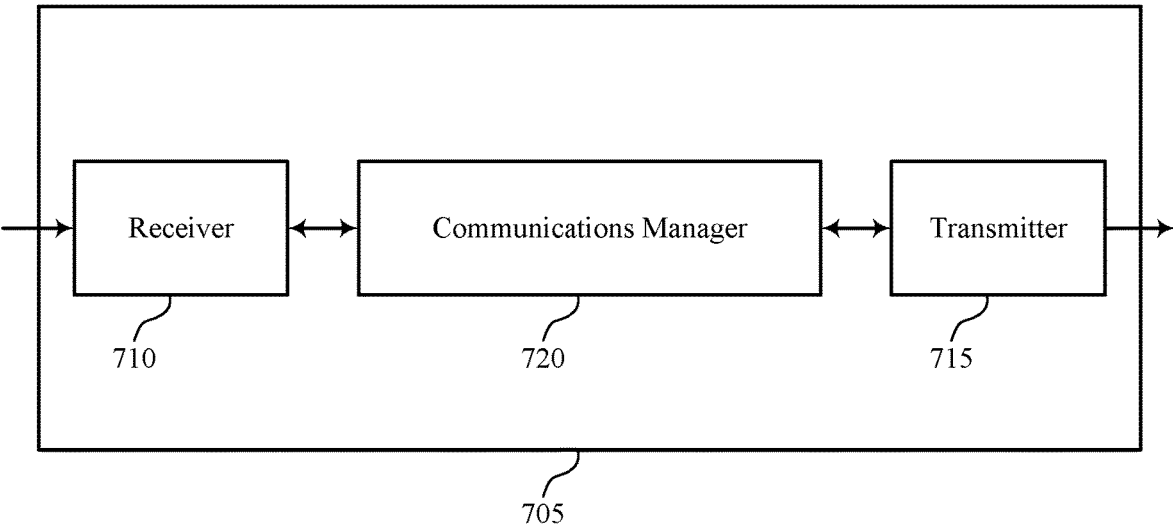
FIGS. 7 and 8 show block diagrams of devices that support signaling resource information for sidelink reliability in accordance with aspects of the present disclosure.

FIG. 7 shows a block diagram 700 of a device 705 that supports signaling resource information for sidelink reliability in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to signaling resource information for sidelink reliability). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to signaling resource information for sidelink reliability). In some examples, the transmitter 715 may be co-located with a receiver 710 in a transceiver module. The transmitter 715 may utilize a single antenna or a set of multiple antennas.

The communications manager 720, the receiver 710, transmitter 715, or various combinations thereof or various components thereof may be examples of means for performing various aspects of signaling resource information for sidelink reliability as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving signaling indicating one or more resource reservation rules associated with transmitting a sidelink message that includes reservation information associated with one or more sidelink resources. The communications manager 720 may be configured as or otherwise support a means for determining, based on the one or more resource reservation rules, to include the sidelink message in a physical layer control signal, or a medium access control layer control signal, or both. The communications manager 720 may be configured as or otherwise support a means for transmitting, to a second UE, the sidelink message in the physical layer control signal, or the medium access control layer control signal, or both based on the determining.

Additionally or alternatively, the communications manager 720 may support wireless communications at a first UE in accordance with examples as disclosed herein. For example, the communications manager 720 may be configured as or otherwise support a means for determining a set of one or more sidelink resources for transmitting resource reservation information including self-reservation information associated with an upcoming sidelink transmission. The communications manager 720 may be configured as or otherwise support a means for transmitting, to a second UE, the resource reservation information associated with the upcoming sidelink transmission on the set of one or more sidelink resources and in accordance with one or more rules.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources.

Figure 8:
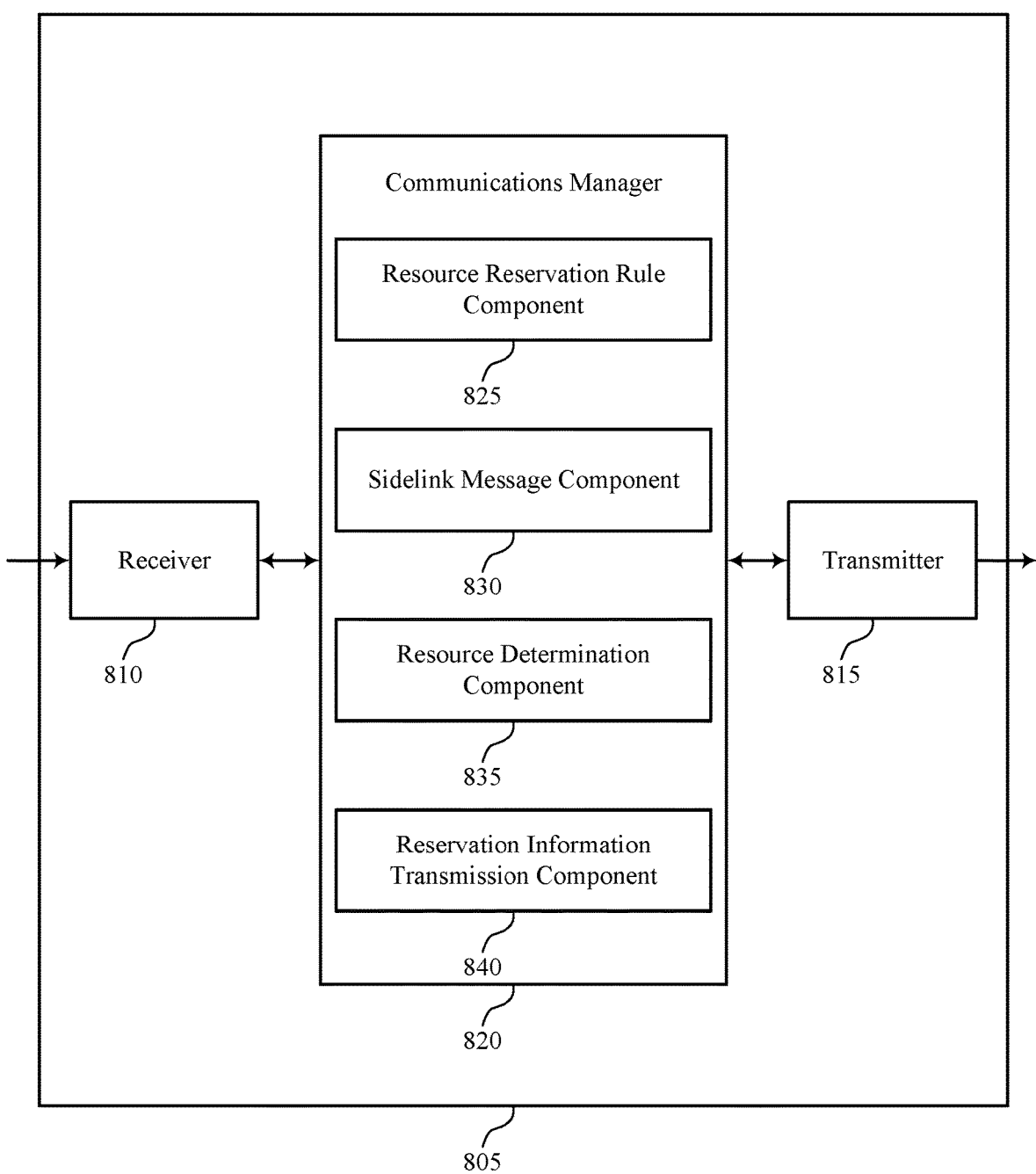

FIG. 8 shows a block diagram 800 of a device 805 that supports signaling resource information for sidelink reliability in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to signaling resource information for sidelink reliability). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to signaling resource information for sidelink reliability). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of signaling resource information for sidelink reliability as described herein. For example, the communications manager 820 may include a resource reservation rule component 825, a sidelink message component 830, a resource determination component 835, a reservation information transmission component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The resource reservation rule component 825 may be configured as or otherwise support a means for receiving signaling indicating one or more resource reservation rules associated with transmitting a sidelink message that includes reservation information associated with one or more sidelink resources. The sidelink message component 830 may be configured as or otherwise support a means for determining, based on the one or more resource reservation rules, to include the sidelink message in a physical layer control signal, or a medium access control layer control signal, or both. The sidelink message component 830 may be configured as or otherwise support a means for transmitting, to a second UE, the sidelink message in the physical layer control signal, or the medium access control layer control signal, or both based on the determining.

Additionally or alternatively, the communications manager 820 may support wireless communications at a first UE in accordance with examples as disclosed herein. The resource determination component 835 may be configured as or otherwise support a means for determining a set of one or more sidelink resources for transmitting resource reservation information including self-reservation information associated with an upcoming sidelink transmission. The reservation information transmission component 840 may be configured as or otherwise support a means for transmitting, to a second UE, the resource reservation information associated with the upcoming sidelink transmission on the set of one or more sidelink resources and in accordance with one or more rules.

Figure 9:
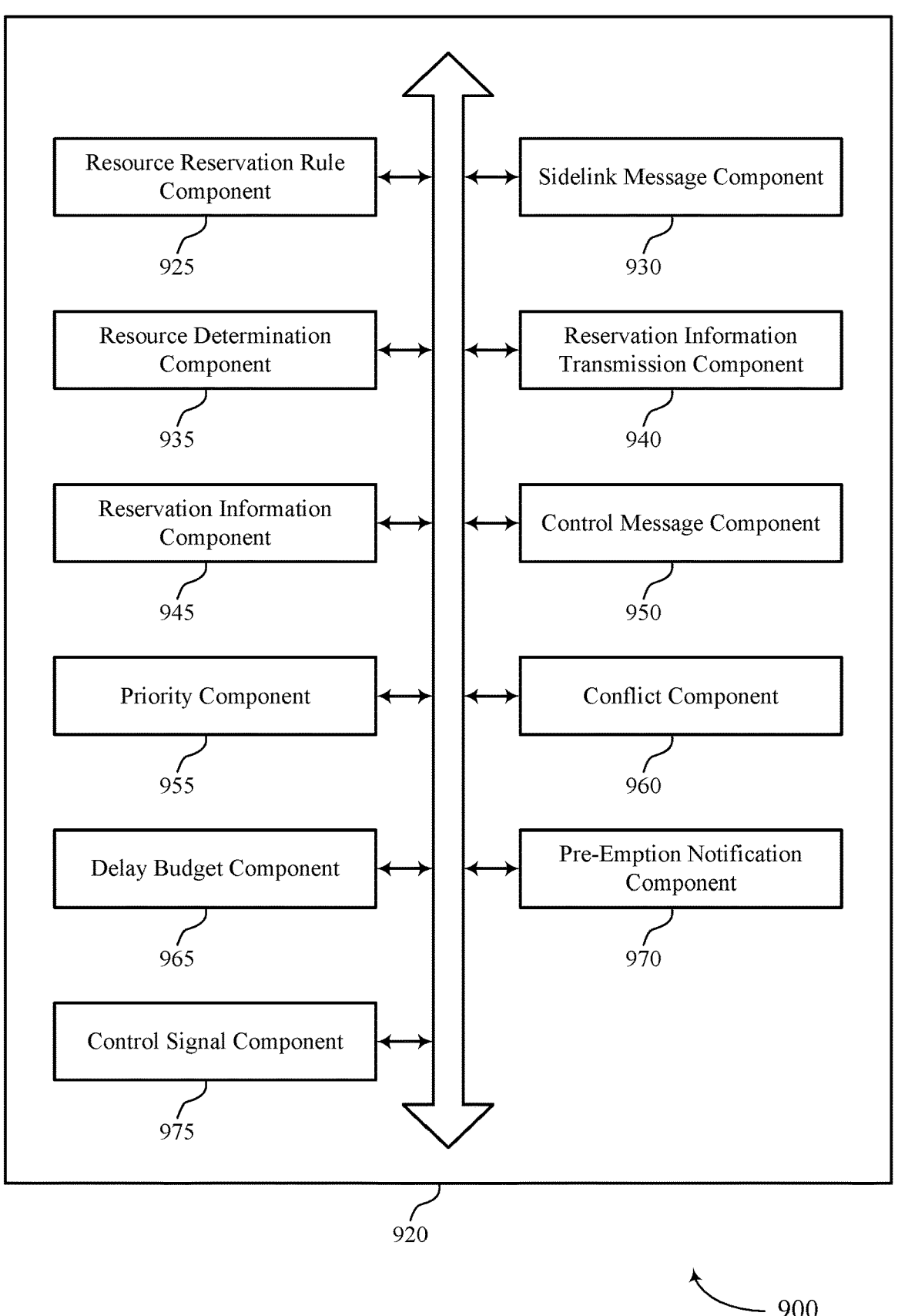
FIG. 9 shows a block diagram of a communications manager that supports signaling resource information for sidelink reliability in accordance with aspects of the present disclosure.

FIG. 9 shows a block diagram 900 of a communications manager 920 that supports signaling resource information for sidelink reliability in accordance with aspects of the present disclosure. The communications manager 920 may be an example of aspects of a communications manager 720, a communications manager 820, or both, as described herein. The communications manager 920, or various components thereof, may be an example of means for performing various aspects of signaling resource information for sidelink reliability as described herein. For example, the communications manager 920 may include a resource reservation rule component 925, a sidelink message component 930, a resource determination component 935, a reservation information transmission component 940, a reservation information control component 945, a control message component 950, a priority component 955, a conflict component 960, a delay budget component 965, a pre-emption notification component 970, a control signal component 975, or any combination thereof. Each of these components may communicate, directly or indirectly, with one another (e.g., via one or more buses).

The communications manager 920 may support wireless communications at a first UE in accordance with examples as disclosed herein. The resource reservation rule component 925 may be configured as or otherwise support a means for receiving signaling indicating one or more resource reservation rules associated with transmitting a sidelink message that includes reservation information associated with one or more sidelink resources. The sidelink message component 930 may be configured as or otherwise support a means for determining, based on the one or more resource reservation rules, to include the sidelink message in a physical layer control signal, or a medium access control layer control signal, or both. In some examples, the sidelink message component 930 may be configured as or otherwise support a means for transmitting, to a second UE, the sidelink message in the physical layer control signal, or the medium access control layer control signal, or both based on the determining.

In some examples, to support transmitting the sidelink message in the physical layer control signal, the reservation information component 945 may be configured as or otherwise support a means for transmitting, to the second UE, the reservation information associated with the one or more sidelink resources in one or more fields of a sidelink control information signal, where the one or more fields of the sidelink control information signal are allocated for transmission of at least one of an acknowledgement process identifier, a destination identifier, a communication range threshold, or any combination thereof.

In some examples, the control signal component 975 may be configured as or otherwise support a means for transmitting, to the second UE, the sidelink control information including an indication of the one or more fields being reallocated for transmission of the reservation information associated with the one or more sidelink resources. In some examples, to support transmitting the sidelink message in the physical layer control signal, the control message component 950 may be configured as or otherwise support a means for transmitting, to the second UE, a first message associated with a sidelink control information, the first message indicating that a second message associated with the sidelink control information includes the reservation information associated with the one or more sidelink resources. In some examples, to support transmitting the sidelink message in the physical layer control signal, the control message component 950 may be configured as or otherwise support a means for transmitting, to the second UE, the second message associated with the sidelink control information.

In some examples, the second message associated with the sidelink control information includes at least one of a set of one or more bits indicating information related to the one or more sidelink resources, a list of bits indicating the information related to the one or more sidelink resources, a set of one or more bits indicating a reference signal received power, a set of one or more bits indicating hop count, a set of one or more bits indicating a distance, a bit indicating a preference level associated to the one or more sidelink resources, or any combination thereof.

In some examples, to support transmitting the sidelink message in the medium access control layer control signal, the reservation information component 945 may be configured as or otherwise support a means for transmitting, to the second UE, the reservation information associated with the one or more sidelink resources in a medium access control layer control element.

In some examples, the medium access control layer control element includes at least one of a set of one or more bits indicating a time-resource assignment, a bit indicating a preference level associated to the one or more sidelink resources, a set of one or more bits indicating hop count, a set of one or more bits indicating a reference signal received power, a set of one or more bits indicating a distance to originator, set of one or more bits indicating a distance to a last hop, a set of one or more bits indicating a zone identifier associated with the originator, a set of one or more bits indicating a periodicity of reservation, or any combination thereof.

In some examples, to support transmitting the sidelink message in the medium access control layer control signal, the reservation information component 945 may be configured as or otherwise support a means for transmitting, to the second UE, the reservation information associated with the one or more sidelink resources in one or more bitmaps included in a physical layer control signal or a medium access control layer control element.

In some examples, the one or more bitmaps include at least one of a bit indicating a preference level associated to the one or more sidelink resources, a set of one or more bits corresponding to a set of one or more time and frequency resources allocated to future time periods, a set of one or more bits indicating a reference signal received power level, a set of one or more bits indicating a reference signal received power, or any combination thereof. In some examples, the reservation information component 945 may be configured as or otherwise support a means for transmitting, to the second UE, an indication of an information sharing format in a sub-header of the medium access control layer control element, where transmitting the one or more bitmaps is based on the information sharing format.

In some examples, to support transmitting the sidelink message in the physical layer control signal and the medium access control layer control signal, the reservation information component 945 may be configured as or otherwise support a means for transmitting, to the second UE, a first portion of the reservation information associated with the one or more sidelink resources in a sidelink control information signal and a second portion of the reservation information associated with the one or more sidelink resources in a medium access control layer control element.

In some examples, the first portion of the reservation information associated with the one or more sidelink resources includes at least one of a self-reservation information, reservation information associated with an upcoming transmission, reservation information associated with a high priority transmission, reservation information associated with a collision detection, reservation information associated with a reference signal received power level greater than a threshold, or any combination thereof.

Additionally or alternatively, the communications manager 920 may support wireless communications at a first UE in accordance with examples as disclosed herein. The resource determination component 935 may be configured as or otherwise support a means for determining a set of one or more sidelink resources for transmitting resource reservation information including self-reservation information associated with an upcoming sidelink transmission. The reservation information transmission component 940 may be configured as or otherwise support a means for transmitting, to a second UE, the resource reservation information associated with the upcoming sidelink transmission on the set of one or more sidelink resources and in accordance with one or more rules.

In some examples, to support transmitting the resource reservation information, the reservation information transmission component 940 may be configured as or otherwise support a means for transmitting, to the second UE, the resource reservation information after a first transmission of a data packet or prior to at least one of the first transmission of the data packet, each transmission of the data packet, each re-transmission of the data packet, a set of one or more transmissions of the data packet, a set of one or more re-transmissions of the data packet, each transmission of an unreserved data packet, each re-transmission of the unreserved data packet, or any combination thereof.

In some examples, to support transmitting the resource reservation information, the reservation information transmission component 940 may be configured as or otherwise support a means for transmitting, to the second UE, the resource reservation information based on at least one of feedback information, a conflict notification, reservation information received from one or more UEs, or any combination thereof. In some examples, the priority component 955 may be configured as or otherwise support a means for determining that the upcoming sidelink transmission is associated with a priority greater than a threshold, where transmitting the resource reservation information associated with the upcoming sidelink transmission is based on the determining.

In some examples, the conflict component 960 may be configured as or otherwise support a means for determining a likelihood of conflict for the upcoming sidelink transmission based on at least one of a set of multiple prior re-transmissions, a packet loss statistic, a channel busy ratio, or any combination thereof, where transmitting the resource reservation information associated with the upcoming sidelink transmission is based on the determining. In some examples, the delay budget component 965 may be configured as or otherwise support a means for determining that the upcoming sidelink transmission is associated with a delay budget less than a threshold, where transmitting the resource reservation information associated with the upcoming sidelink transmission is based on the determining.

In some examples, the conflict component 960 may be configured as or otherwise support a means for receiving a set of multiple collision notifications from one or more neighboring UEs, where transmitting the resource reservation information associated with the upcoming sidelink transmission is based on receiving the set of multiple collision notifications. In some examples, the one or more rules indicate that the resource reservation information is re-transmitted for a threshold number of transmissions. In some examples, the threshold number of transmissions is determined based on at least one of a delay budget, a processing time, a channel congestion, or any combination thereof.

In some examples, to support determining the set of one or more sidelink resources, the resource determination component 935 may be configured as or otherwise support a means for determining the set of one or more sidelink resources based on at least one of sensing information, one or more configured resources, a time to process and generate a resource forwarding message, a time for a receiver to decode and process the resource forwarding message, or any combination thereof.

In some examples, to support determining the set of one or more sidelink resources, the resource determination component 935 may be configured as or otherwise support a means for determining the set of one or more sidelink resources based on removing at least one sidelink resource from the set of one or more sidelink resources, where a transmission or reception is scheduled for a time period associated with the at least one sidelink resource. In some examples, the one or more rules indicate that a second resource reservation information is transmitted a threshold time period after transmission of the resource reservation information.

In some examples, the pre-emption notification component 970 may be configured as or otherwise support a means for receiving a pre-emption notification associated with the upcoming sidelink transmission on the set of one or more sidelink resources. In some examples, the resource determination component 935 may be configured as or otherwise support a means for determining a second set of one or more sidelink resources for transmitting a second resource reservation information based on the pre-emption notification.

In some examples, the conflict component 960 may be configured as or otherwise support a means for receiving, from a third UE, a pre-conflict notification associated with the upcoming sidelink transmission on the set of one or more sidelink resources. In some examples, the resource determination component 935 may be configured as or otherwise support a means for determining a second set of one or more sidelink resources for transmitting a second resource reservation information based on the pre-conflict notification. In some examples, the resource determination component 935 may be configured as or otherwise support a means for receiving a resource overlap notification associated with the upcoming sidelink transmission on the set of one or more sidelink resources, where transmitting the resource reservation information is based on receiving the resource overlap notification.

Figure 10:
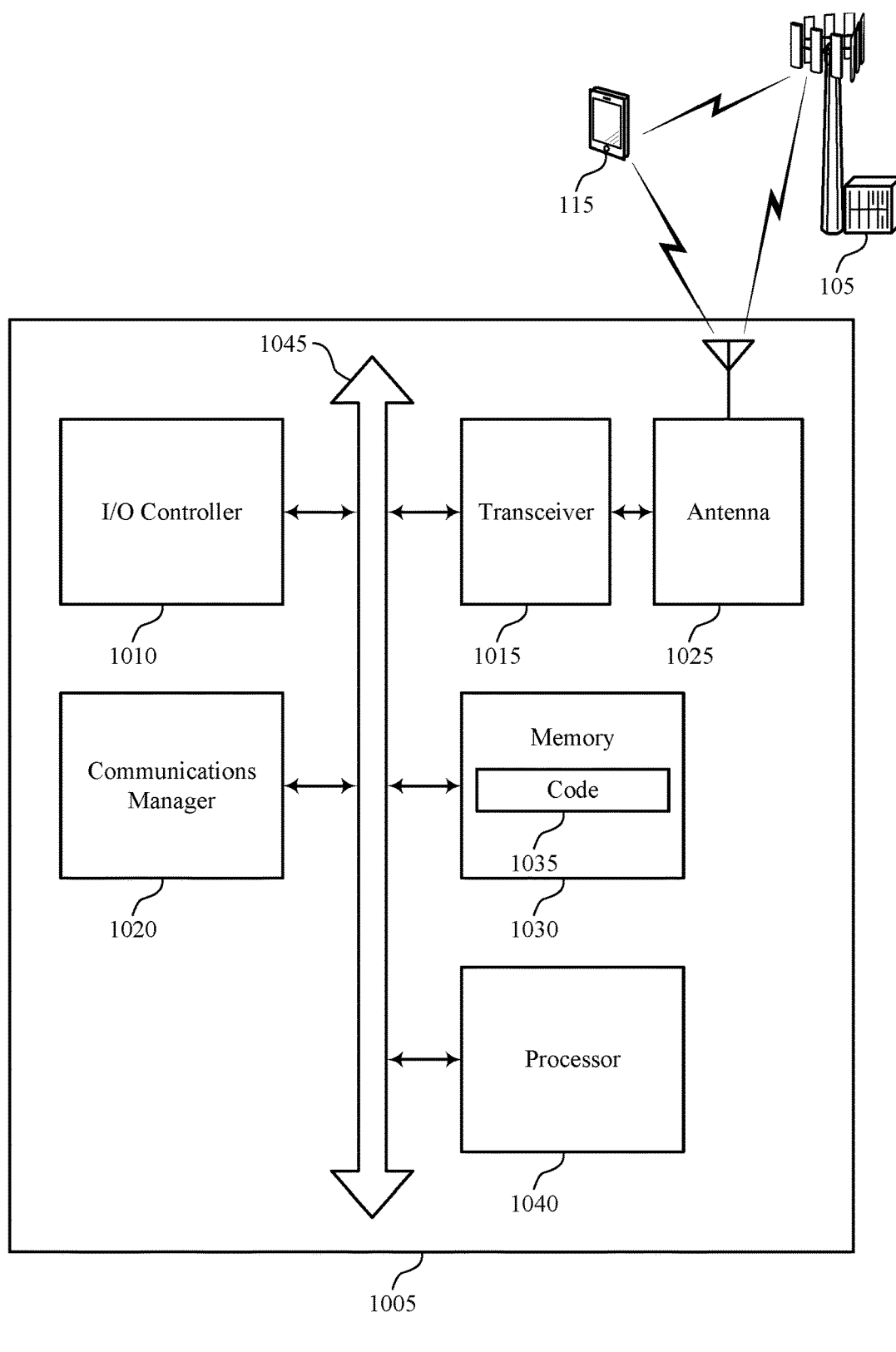
FIG. 10 shows a diagram of a system including a device that supports signaling resource information for sidelink reliability in accordance with aspects of the present disclosure.

FIG. 10 shows a diagram of a system 1000 including a device 1005 that supports signaling resource information for sidelink reliability in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting signaling resource information for sidelink reliability). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving signaling indicating one or more resource reservation rules associated with transmitting a sidelink message that includes reservation information associated with one or more sidelink resources. The communications manager 1020 may be configured as or otherwise support a means for determining, based on the one or more resource reservation rules, to include the sidelink message in a physical layer control signal, or a medium access control layer control signal, or both. The communications manager 1020 may be configured as or otherwise support a means for transmitting, to a second UE, the sidelink message in the physical layer control signal, or the medium access control layer control signal, or both based on the determining.

Additionally or alternatively, the communications manager 1020 may support wireless communications at a first UE in accordance with examples as disclosed herein. For example, the communications manager 1020 may be configured as or otherwise support a means for determining a set of one or more sidelink resources for transmitting resource reservation information including self-reservation information associated with an upcoming sidelink transmission. The communications manager 1020 may be configured as or otherwise support a means for transmitting, to a second UE, the resource reservation information associated with the upcoming sidelink transmission on the set of one or more sidelink resources and in accordance with one or more rules.

By including or configuring the communications manager 1020 in accordance with examples as described herein, the device 1005 may support techniques for improved communication reliability, more efficient utilization of communication resources, improved coordination between devices, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of signaling resource information for sidelink reliability as described herein, or the processor 1040 and the memory 1030 may be otherwise configured to perform or support such operations.

FIG. 11 shows a flowchart illustrating a method 1100 that supports signaling resource information for sidelink reliability in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving signaling indicating one or more resource reservation rules associated with transmitting a sidelink message that includes reservation information associated with one or more sidelink resources. The operations of 1105 may be performed in accordance with examples as disclosed herein. In some examples, aspects of the operations of 1105 may be performed by a resource reservation rule component 925 as described with reference to FIG. 9.

At 1110, the method may include determining, based on the one or more resource reservation rules, to include the sidelink message in a physical layer control signal, or a medium access control layer control signal, or both. The operations of 1110 may be performed in accordance with examples as disclosed herein. In some examples, aspects of the operations of 1110 may be performed by a sidelink message component 930 as described with reference to FIG. 9.

At 1115, the method may include transmitting, to a second UE, the sidelink message in the physical layer control signal, or the medium access control layer control signal, or both based on the determining. The operations of 1115 may be performed in accordance with examples as disclosed herein. In some examples, aspects of the operations of 1115 may be performed by a sidelink message component 930 as described with reference to FIG. 9.

FIG. 12 shows a flowchart illustrating a method 1200 that supports signaling resource information for sidelink reliability in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving signaling indicating one or more resource reservation rules associated with transmitting a sidelink message that includes reservation information associated with one or more sidelink resources. The operations of 1205 may be performed in accordance with examples as disclosed herein. In some examples, aspects of the operations of 1205 may be performed by a resource reservation rule component 925 as described with reference to FIG. 9.

At 1210, the method may include determining, based on the one or more resource reservation rules, to include the sidelink message in a physical layer control signal, or a medium access control layer control signal, or both. The operations of 1210 may be performed in accordance with examples as disclosed herein. In some examples, aspects of the operations of 1210 may be performed by a sidelink message component 930 as described with reference to FIG. 9.

At 1215, the method may include transmitting, to the second UE, the sidelink control information signal including an indication of the one or more fields being reallocated for transmission of the reservation information associated with the one or more sidelink resources. The operations of 1215 may be performed in accordance with examples as disclosed herein. In some examples, aspects of the operations of 1215 may be performed by a control signal component 975 as described with reference to FIG. 9.

At 1220, the method may include transmitting, to the second UE, the reservation information associated with the one or more sidelink resources in one or more fields of a sidelink control information signal, where the one or more fields of the sidelink control information signal are allocated for transmission of at least one of an acknowledgement process identifier, a destination identifier, a communication range threshold, or any combination thereof. The operations of 1220 may be performed in accordance with examples as disclosed herein. In some examples, aspects of the operations of 1220 may be performed by a reservation information component 945 as described with reference to FIG. 9.

At 1225, the method may include transmitting, to a second UE, the sidelink message in the physical layer control signal, or the medium access control layer control signal, or both based on the determining. The operations of 1225 may be performed in accordance with examples as disclosed herein. In some examples, aspects of the operations of 1225 may be performed by a sidelink message component 930 as described with reference to FIG. 9.

FIG. 13 shows a flowchart illustrating a method 1300 that supports signaling resource information for sidelink reliability in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include determining a set of one or more sidelink resources for transmitting resource reservation information including self-reservation information associated with an upcoming sidelink transmission. The operations of 1305 may be performed in accordance with examples as disclosed herein. In some examples, aspects of the operations of 1305 may be performed by a resource determination component 935 as described with reference to FIG. 9.

At 1310, the method may include transmitting, to a second UE, the resource reservation information associated with the upcoming sidelink transmission on the set of one or more sidelink resources and in accordance with one or more rules. The operations of 1310 may be performed in accordance with examples as disclosed herein. In some examples, aspects of the operations of 1310 may be performed by a reservation information transmission component 940 as described with reference to FIG. 9.

FIG. 14 shows a flowchart illustrating a method 1400 that supports signaling resource information for sidelink reliability in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include determining a set of one or more sidelink resources for transmitting resource reservation information including self-reservation information associated with an upcoming sidelink transmission. The operations of 1405 may be performed in accordance with examples as disclosed herein. In some examples, aspects of the operations of 1405 may be performed by a resource determination component 935 as described with reference to FIG. 9.

At 1410, the method may include receiving a pre-emption notification or a pre-conflict notification associated with the upcoming sidelink transmission on the set of one or more sidelink resources. The operations of 1410 may be performed in accordance with examples as disclosed herein. In some examples, aspects of the operations of 1410 may be performed by a pre-emption notification component 970 as described with reference to FIG. 9.

At 1415, the method may include determining a second set of one or more sidelink resources for transmitting a second resource reservation information based on the pre-emption notification or the pre-conflict notification. The operations of 1415 may be performed in accordance with examples as disclosed herein. In some examples, aspects of the operations of 1415 may be performed by a resource determination component 935 as described with reference to FIG. 9.

At 1420, the method may include transmitting, to a second UE, the resource reservation information associated with the upcoming sidelink transmission on the set of one or more sidelink resources and in accordance with one or more rules. The operations of 1420 may be performed in accordance with examples as disclosed herein. In some examples, aspects of the operations of 1420 may be performed by a reservation information transmission component 940 as described with reference to FIG. 9.

The following provides an overview of aspects of the present disclosure:

Aspect 1: A method for wireless communications at a first UE, comprising: receiving signaling indicating one or more resource reservation rules associated with transmitting a sidelink message that includes reservation information associated with one or more sidelink resources: determining, based at least in part on the one or more resource reservation rules, to include the sidelink message in a physical layer control signal, or a medium access control layer control signal, or both; and transmitting, to a second UE, the sidelink message in the physical layer control signal, or the medium access control layer control signal, or both based at least in part on the determining.

Aspect 2: The method of aspect 1, wherein transmitting the sidelink message in the physical layer control signal further comprises: transmitting, to the second UE, the reservation information associated with the one or more sidelink resources in one or more fields of a sidelink control information signal, wherein the one or more fields of the sidelink control information signal are allocated for transmission of at least one of an acknowledgement process identifier, a destination identifier, a communication range threshold, or any combination thereof.

Aspect 3: The method of aspect 2, further comprising: transmitting, to the second UE, the sidelink control information signal comprising an indication of the one or more fields being reallocated for transmission of the reservation information associated with the one or more sidelink resources.

Aspect 4: The method of any of aspects 1 through 3, wherein transmitting the sidelink message in the physical layer control signal further comprises: transmitting, to the second UE, a first message associated with a sidelink control information, the first message indicating that a second message associated with the sidelink control information comprises the reservation information associated with the one or more sidelink resources; and transmitting, to the second UE, the second message associated with the sidelink control information.

Aspect 5: The method of aspect 4, wherein the second message associated with the sidelink control information comprises at least one of a set of one or more bits indicating information related to the one or more sidelink resources, a list of bits indicating the information related to the one or more sidelink resources, a set of one or more bits indicating a reference signal received power, a set of one or more bits indicating hop count, a set of one or more bits indicating a distance, a bit indicating a preference level associated to the one or more sidelink resources, or any combination thereof.

Aspect 6: The method of any of aspects 1 through 5, wherein transmitting the sidelink message in the medium access control layer control signal further comprises: transmitting, to the second UE, the reservation information associated with the one or more sidelink resources in a medium access control layer control element.

Aspect 7: The method of aspect 6, wherein the medium access control layer control element comprises at least one of a set of one or more bits indicating a time-resource assignment, a bit indicating a preference level associated to the one or more sidelink resources, a set of one or more bits indicating hop count, a set of one or more bits indicating a reference signal received power, a set of one or more bits indicating a distance to originator, set of one or more bits indicating a distance to a last hop, a set of one or more bits indicating a zone identifier associated with the originator, a set of one or more bits indicating a periodicity of reservation, or any combination thereof.

Aspect 8: The method of any of aspects 1 through 7, wherein transmitting the sidelink message in the medium access control layer control signal further comprises: transmitting, to the second UE, the reservation information associated with the one or more sidelink resources in one or more bitmaps included in a physical layer control signal or a medium access control layer control element.

Aspect 9: The method of aspect 8, wherein the one or more bitmaps comprise at least one of a bit indicating a preference level associated to the one or more sidelink resources, a set of one or more bits corresponding to a set of one or more time and frequency resources allocated to future time periods, a set of one or more bits indicating a reference signal received power level, a set of one or more bits indicating a reference signal received power, or any combination thereof.

Aspect 10: The method of any of aspects 8 through 9, further comprising: transmitting, to the second UE, an indication of an information sharing format in a subheader of the medium access control layer control element, wherein transmitting the one or more bitmaps is based at least in part on the information sharing format.

Aspect 11: The method of any of aspects 1 through 10, wherein transmitting the sidelink message in the physical layer control signal and the medium access control layer control signal further comprises: transmitting, to the second UE, a first portion of the reservation information associated with the one or more sidelink resources in a sidelink control information signal and a second portion of the reservation information associated with the one or more sidelink resources in a medium access control layer control element.

Aspect 12: The method of aspect 11, wherein the first portion of the reservation information associated with the one or more sidelink resources comprises at least one of a self-reservation information, reservation information associated with an upcoming transmission, reservation information associated with a high priority transmission, reservation information associated with a collision detection, reservation information associated with a reference signal received power level greater than a threshold, or any combination thereof.

Aspect 13: A method for wireless communications at a first UE, comprising: determining a set of one or more sidelink resources for transmitting resource reservation information including self-reservation information associated with an upcoming sidelink transmission; and transmitting, to a second UE, the resource reservation information associated with the upcoming sidelink transmission on the set of one or more sidelink resources and in accordance with one or more rules.

Aspect 14: The method of aspect 13, wherein transmitting the resource reservation information further comprises: transmitting, to the second UE, the resource reservation information after a first transmission of a data packet or prior to at least one of the first transmission of the data packet, each transmission of the data packet, each re-transmission of the data packet, a set of one or more transmissions of the data packet, a set of one or more re-transmissions of the data packet, each transmission of an unreserved data packet, each re-transmission of the unreserved data packet, or any combination thereof.

Aspect 15: The method of any of aspects 13 through 14, wherein transmitting the resource reservation information further comprises: transmitting, to the second UE, the resource reservation information based at least in part on at least one of feedback information, a conflict notification, reservation information received from one or more UEs, or any combination thereof.

Aspect 16: The method of any of aspects 13 through 15, further comprising: determining that the upcoming sidelink transmission is associated with a priority greater than a threshold, wherein transmitting the resource reservation information associated with the upcoming sidelink transmission is based at least in part on the determining.

Aspect 17: The method of any of aspects 13 through 16, further comprising: determining a likelihood of conflict for the upcoming sidelink transmission is based at least in part on at least one of a plurality of prior re-transmissions, a packet loss statistic, a channel busy ratio, or any combination thereof, wherein transmitting the resource reservation information associated with the upcoming sidelink transmission is based at least in part on the determining.

Aspect 18: The method of any of aspects 13 through 17, further comprising: determining that the upcoming sidelink transmission is associated with a delay budget less than a threshold, wherein transmitting the resource reservation information associated with the upcoming sidelink transmission is based at least in part on the determining.

Aspect 19: The method of any of aspects 13 through 18, further comprising: receiving a plurality of collision notifications from one or more neighboring UEs, wherein transmitting the resource reservation information associated with the upcoming sidelink transmission is based at least in part on receiving the plurality of collision notifications.

Aspect 20: The method of any of aspects 13 through 19, wherein the one or more rules indicate that the resource reservation information is re-transmitted for a threshold number of transmissions, the threshold number of transmissions is determined based at least in part on at least one of a delay budget, a processing time, a channel congestion, or any combination thereof.

Aspect 21: The method of any of aspects 13 through 20, wherein determining the set of one or more sidelink resources further comprises: determining the set of one or more sidelink resources based at least in part on at least one of sensing information, one or more configured resources, a time to process and generate a resource forwarding message, a time for a receiver to decode and process the resource forwarding message, or any combination thereof.

Aspect 22: The method of any of aspects 13 through 21, wherein determining the set of one or more sidelink resources further comprises: determining the set of one or more sidelink resources based at least in part on removing at least one sidelink resource from the set of one or more sidelink resources, wherein a transmission or reception is scheduled for a time period associated with the at least one sidelink resource.

Aspect 23: The method of any of aspects 13 through 22, wherein the one or more rules indicate that a second resource reservation information is transmitted a threshold time period after transmission of the resource reservation information.

Aspect 24: The method of any of aspects 13 through 23, further comprising: receiving a pre-emption notification associated with the upcoming sidelink transmission on the set of one or more sidelink resources; and determining a second set of one or more sidelink resources for transmitting a second resource reservation information based at least in part on the pre-emption notification.

Aspect 25: The method of any of aspects 13 through 24, further comprising: receiving, from a third UE, a pre-conflict notification associated with the upcoming sidelink transmission on the set of one or more sidelink resources; and determining a second set of one or more sidelink resources for transmitting a second resource reservation information based at least in part on the pre-conflict notification.

Aspect 26: The method of any of aspects 13 through 25, further comprising: receiving a resource overlap notification associated with the upcoming sidelink transmission on the set of one or more sidelink resources, wherein transmitting the resource reservation information is based at least in part on receiving the resource overlap notification.

Aspect 27: An apparatus for wireless communications at a first UE, comprising a processor: memory coupled with the processor; and instructions stored in the memory and executable by the processor to cause the apparatus to perform a method of any of aspects 1 through 12.

Aspect 28: An apparatus for wireless communications at a first UE, comprising at least one means for performing a method of any of aspects 1 through 12.

Aspect 29: A non-transitory computer-readable medium storing code for wireless communications at a first UE, the code comprising instructions executable by a processor to perform a method of any of aspects 1 through 12.

Aspect 30: An apparatus for wireless communications at a first UE, comprising a processor: memory coupled with the processor; and instructions stored in the memory and executable by the processor to cause the apparatus to perform a method of any of aspects 13 through 26.

Aspect 31: An apparatus for wireless communications at a first UE, comprising at least one means for performing a method of any of aspects 13 through 26.

Aspect 32: A non-transitory computer-readable medium storing code for wireless communications at a first UE, the code comprising instructions executable by a processor to perform a method of any of aspects 13 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:

a processor;

memory coupled with the processor; and instructions stored in the memory and executable by the processor to cause the apparatus to:

receive signaling indicating one or more resource reservation rules associated with transmitting a sidelink message that includes reservation information associated with one or more sidelink resources;

determine, based at least in part on the one or more resource reservation rules, to include the sidelink message in a physical layer control signal, or a medium access control layer control signal, or both; and transmit, to a second UE, the sidelink message in the physical layer control signal, or the medium access control layer control signal, or both based at least in part on the determining, wherein the instructions to transmit the sidelink message in the physical layer control signal are further executable by the processor to cause the apparatus to:

transmit, to the second UE, the reservation information associated with the one or more sidelink resources in one or more fields of a sidelink control information signal, wherein the one or more fields of the sidelink control information signal are allocated for transmission of at least one of an acknowledgement process identifier, a destination identifier, a communication range threshold, or any combination thereof.

2. The apparatus of claim 1, wherein the instructions are further executable by the processor to cause the apparatus to:

transmit, to the second UE, the sidelink control information signal comprising an indication of the one or more fields being reallocated for transmission of the reservation information associated with the one or more sidelink resources.

3. The apparatus of claim 1, wherein the instructions to transmit the sidelink message in the physical layer control signal are further executable by the processor to cause the apparatus to:

transmit, to the second UE, a first message associated with a sidelink control information, the first message indicating that a second message associated with the sidelink control information comprises the reservation information associated with the one or more sidelink resources; and transmit, to the second UE, the second message associated with the sidelink control information.

4. The apparatus of claim 3, wherein the second message associated with the sidelink control information comprises at least one of a set of one or more bits indicating information related to the one or more sidelink resources, a list of bits indicating the information related to the one or more sidelink resources, a set of one or more bits indicating a reference signal received power, a set of one or more bits indicating hop count, a set of one or more bits indicating a distance, a bit indicating a preference level associated to the one or more sidelink resources, or any combination thereof.

5. The apparatus of claim 1, wherein the instructions to transmit the sidelink message in the medium access control layer control signal are further executable by the processor to cause the apparatus to:

transmit, to the second UE, the reservation information associated with the one or more sidelink resources in a medium access control layer control element.

6. The apparatus of claim 5, wherein the medium access control layer control element comprises at least one of a set of one or more bits indicating a time-resource assignment, a bit indicating a preference level associated to the one or more sidelink resources, a set of one or more bits indicating hop count, a set of one or more bits indicating a reference signal received power, a set of one or more bits indicating a distance to originator, a set of one or more bits indicating a distance to a last hop, a set of one or more bits indicating a zone identifier associated with the originator, a set of one or more bits indicating a periodicity of reservation, or any combination thereof.

7. The apparatus of claim 1, wherein the instructions to transmit the sidelink message in the medium access control layer control signal are further executable by the processor to cause the apparatus to:

transmit, to the second UE, the reservation information associated with the one or more sidelink resources in one or more bitmaps included in a medium access control layer control element.

8. The apparatus of claim 7, wherein the one or more bitmaps comprise at least one of a bit indicating a preference level associated to the one or more sidelink resources, a set of one or more bits corresponding to a set of one or more time and frequency resources allocated to future time periods, a set of one or more bits indicating a reference signal received power level, a set of one or more bits indicating a reference signal received power, or any combination thereof.

9. The apparatus of claim 7, wherein the instructions are further executable by the processor to cause the apparatus to:

transmit, to the second UE, an indication of an information sharing format in a sub-header of the medium access control layer control element, wherein transmitting the one or more bitmaps is based at least in part on the information sharing format.

10. The apparatus of claim 1, wherein the instructions to transmit the sidelink message in the physical layer control signal and the medium access control layer control signal are further executable by the processor to cause the apparatus to:

transmit, to the second UE, a first portion of the reservation information associated with the one or more sidelink resources in the sidelink control information signal and a second portion of the reservation information associated with the one or more sidelink resources in a medium access control layer control element.

11. The apparatus of claim 10, wherein the first portion of the reservation information associated with the one or more sidelink resources comprises at least one of a self-reservation information, reservation information associated with an upcoming transmission, reservation information associated with a high priority transmission, reservation information associated with a collision detection, reservation information associated with a reference signal received power level greater than a threshold, or any combination thereof.

12. An apparatus for wireless communications at a first user equipment (UE), comprising:

a processor;

memory coupled with the processor; and instructions stored in the memory and executable by the processor to cause the apparatus to:

determine a set of one or more sidelink resources for transmitting resource reservation information including self-reservation information associated with an upcoming sidelink transmission; and transmit, to a second UE in a physical layer control signal, the resource reservation information associated with the upcoming sidelink transmission on the set of one or more sidelink resources and in accordance with one or more rules, wherein the instructions to transmit the resource reservation information in the physical layer control signal are further executable by the processor to cause the apparatus to:

transmit, to the second UE, the resource reservation information in one or more fields of a sidelink control information signal, wherein the one or more fields of the sidelink control information signal are allocated for transmission of at least one of an acknowledgement process identifier, a destination identifier, a communication range threshold, or any combination thereof.

13. The apparatus of claim 12, wherein the instructions to transmit the resource reservation information are further executable by the processor to cause the apparatus to:

transmit, to the second UE, the resource reservation information after a first transmission of a data packet or prior to at least one of the first transmission of the data packet, each transmission of the data packet, each re-transmission of the data packet, a set of one or more transmissions of the data packet, a set of one or more re-transmissions of the data packet, each transmission of an unreserved data packet, each re-transmission of the unreserved data packet, or any combination thereof.

14. The apparatus of claim 12, wherein the instructions to transmit the resource reservation information are further executable by the processor to cause the apparatus to:

transmit, to the second UE, the resource reservation information based at least in part on at least one of feedback information, a conflict notification, reservation information received from one or more UEs, or any combination thereof.

15. The apparatus of claim 12, wherein the instructions are further executable by the processor to cause the apparatus to:

determine that the upcoming sidelink transmission is associated with a priority greater than a threshold, wherein transmitting the resource reservation information associated with the upcoming sidelink transmission is based at least in part on the determining.

16. The apparatus of claim 12, wherein the instructions are further executable by the processor to cause the apparatus to:

determine a likelihood of conflict for the upcoming sidelink transmission based at least in part on at least one of a plurality of prior re-transmissions, a packet loss statistic, a channel busy ratio, or any combination thereof, wherein transmitting the resource reservation information associated with the upcoming sidelink transmission is based at least in part on the determining.

17. The apparatus of claim 12, wherein the instructions are further executable by the processor to cause the apparatus to:

determine that the upcoming sidelink transmission is associated with a delay budget less than a threshold, wherein transmitting the resource reservation information associated with the upcoming sidelink transmission is based at least in part on the determining.

18. The apparatus of claim 12, wherein the instructions are further executable by the processor to cause the apparatus to:

receive a plurality of collision notifications from one or more neighboring UEs, wherein transmitting the resource reservation information associated with the upcoming sidelink transmission is based at least in part on receiving the plurality of collision notifications.

19. The apparatus of claim 12, wherein the one or more rules indicate that the resource reservation information is re-transmitted for a threshold number of transmissions, the threshold number of transmissions is determined based at least in part on at least one of a delay budget, a processing time, a channel congestion, or any combination thereof.

20. The apparatus of claim 12, wherein the instructions to determine the set of one or more sidelink resources are further executable by the processor to cause the apparatus to:

determine the set of one or more sidelink resources based at least in part on at least one of sensing information, one or more configured resources, a time to process and generate a resource forwarding message, a time for a receiver to decode and process the resource forwarding message, or any combination thereof.

21. The apparatus of claim 12, wherein the instructions to determine the set of one or more sidelink resources are further executable by the processor to cause the apparatus to:

determine the set of one or more sidelink resources based at least in part on removing at least one sidelink resource from the set of one or more sidelink resources, wherein a transmission or reception is scheduled for a time period associated with the at least one sidelink resource.

22. The apparatus of claim 12, wherein the one or more rules indicate that a second resource reservation information is transmitted a threshold time period after transmission of the resource reservation information.

23. The apparatus of claim 12, wherein the instructions are further executable by the processor to cause the apparatus to:

receive a pre-emption notification associated with the upcoming sidelink transmission on the set of one or more sidelink resources; and determine a second set of one or more sidelink resources for transmitting a second resource reservation information based at least in part on the pre-emption notification.

24. The apparatus of claim 12, wherein the instructions are further executable by the processor to cause the apparatus to:

receive, from a third UE, a pre-conflict notification associated with the upcoming sidelink transmission on the set of one or more sidelink resources; and determine a second set of one or more sidelink resources for transmitting a second resource reservation information based at least in part on the pre-conflict notification.

25. The apparatus of claim 12, wherein the instructions are further executable by the processor to cause the apparatus to:

receive a resource overlap notification associated with the upcoming sidelink transmission on the set of one or more sidelink resources, wherein transmitting the resource reservation information is based at least in part on receiving the resource overlap notification.

26. A method for wireless communications at a first user equipment (UE), comprising:

receiving signaling indicating one or more resource reservation rules associated with transmitting a sidelink message that includes reservation information associated with one or more sidelink resources;

determining, based at least in part on the one or more resource reservation rules, to include the sidelink message in a physical layer control signal, or a medium access control layer control signal, or both; and transmitting, to a second UE, the sidelink message in the physical layer control signal, or the medium access control layer control signal, or both based at least in part on the determining, wherein transmitting the sidelink message in the physical layer control signal further comprises:

transmitting, to the second UE, the reservation information associated with the one or more sidelink resources in one or more fields of a sidelink control information signal, wherein the one or more fields of the sidelink control information signal are allocated for transmission of at least one of an acknowledgement process identifier, a destination identifier, a communication range threshold, or any combination thereof.

27. A method for wireless communications at a first user equipment (UE), comprising:

determining a set of one or more sidelink resources for transmitting resource reservation information including self-reservation information associated with an upcoming sidelink transmission; and transmitting, to a second UE in a physical layer control signal, the resource reservation information associated with the upcoming sidelink transmission on the set of one or more sidelink resources and in accordance with one or more rules, wherein transmitting the resource reservation information in the physical layer control signal further comprises:

transmitting, to the second UE, the resource reservation information in one or more fields of a sidelink control information signal, wherein the one or more fields of the sidelink control information signal are allocated for transmission of at least one of an acknowledgement process identifier, a destination identifier, a communication range threshold, or any combination thereof.

28. The method of claim 27, wherein transmitting the resource reservation information further comprises:

transmitting, to the second UE, the resource reservation information after a first transmission of a data packet or prior to at least one of the first transmission of the data packet, each transmission of the data packet, each re-transmission of the data packet, a set of one or more transmissions of the data packet, a set of one or more re-transmissions of the data packet, each transmission of an unreserved data packet, each re-transmission of the unreserved data packet, or any combination thereof.

* * * * *